United States Patent
Dai et al.

(10) Patent No.: US 10,615,413 B2
(45) Date of Patent: Apr. 7, 2020

(54) HIGH VOLTAGE, HIGH VOLUMETRIC ENERGY DENSITY LI-ION BATTERY USING ADVANCED CATHODE MATERIALS

(71) Applicant: Apple Inc., Cupertino, CA (US)

(72) Inventors: Hongli Dai, Los Altos, CA (US); Christopher S. Johnson, Naperville, IL (US); Huiming Wu, Darien, IL (US)

(73) Assignee: Apple Inc., Cupertino, CA (US)

( * ) Notice: Subject to any disclaimer, the term of this patent is extended or adjusted under 35 U.S.C. 154(b) by 377 days.

(21) Appl. No.: 14/206,654

(22) Filed: Mar. 12, 2014

(65) Prior Publication Data
US 2014/0272563 A1    Sep. 18, 2014

Related U.S. Application Data

(60) Provisional application No. 61/777,510, filed on Mar. 12, 2013.

(51) Int. Cl.
| | | |
|---|---|---|
| *H01M 4/525* | (2010.01) | |
| *H01M 10/0525* | (2010.01) | |
| *H01M 4/131* | (2010.01) | |
| *H01M 4/505* | (2010.01) | |

(52) U.S. Cl.
CPC .......... *H01M 4/525* (2013.01); *H01M 4/131* (2013.01); *H01M 4/505* (2013.01); *H01M 10/0525* (2013.01)

(58) Field of Classification Search
CPC ...... H01M 4/525; H01M 4/505; H01M 4/131; H01M 10/0525
See application file for complete search history.

(56) References Cited

U.S. PATENT DOCUMENTS

| | | | |
|---|---|---|---|
| 5,744,262 | A | 4/1998 | Cheng et al. |
| 6,007,947 | A | 12/1999 | Mayer |
| 6,077,496 | A | 6/2000 | Hiraoka et al. |
| 6,677,082 | B2 | 1/2004 | Thackeray |
| 6,680,143 | B2 | 1/2004 | Thackeray |
| 6,878,487 | B2 | 4/2005 | Cho et al. |
| 7,135,252 | B2 | 11/2006 | Thackeray |

(Continued)

FOREIGN PATENT DOCUMENTS

| | | |
|---|---|---|
| CN | 1588675 | 3/2005 |
| CN | 1702891 | 11/2005 |

(Continued)

OTHER PUBLICATIONS

English Translation of CN102646831.*

(Continued)

*Primary Examiner* — Milton I Cano
*Assistant Examiner* — Kiran Akhtar
(74) *Attorney, Agent, or Firm* — Polsinelli PC

(57) ABSTRACT

The disclosed embodiments provide a battery cell. The battery cell includes an anode containing an anode current collector and an anode active material disposed over the anode current collector. The battery cell also includes a cathode containing a cathode current collector and a cathode active material disposed over the cathode current collector. The cathode active material has a composition represented by $xLi_2MO_3 \cdot (1-x)LiCo_yM'_{(1-y)}O_2$.

7 Claims, 15 Drawing Sheets

(56) References Cited

U.S. PATENT DOCUMENTS

| | | |
|---|---|---|
| 7,205,072 B2 | 4/2007 | Kang |
| 7,238,450 B2 | 6/2007 | Howard, Jr. et al. |
| 7,314,682 B2 | 1/2008 | Thackeray |
| 7,314,684 B2 | 1/2008 | Kang |
| 7,435,402 B2 | 10/2008 | Kang |
| 7,468,223 B2 | 12/2008 | Thackeray et al. |
| 7,655,361 B2 | 2/2010 | Kim et al. |
| 7,732,096 B2 | 6/2010 | Thackeray |
| 7,754,384 B2 | 7/2010 | Patoux et al. |
| 7,897,674 B2 | 3/2011 | Zaghib |
| 7,923,149 B2 | 4/2011 | Hwang et al. |
| 8,148,011 B2 | 4/2012 | Thackeray |
| 8,187,746 B2 | 5/2012 | Chen |
| 8,206,852 B2 | 6/2012 | Chang et al. |
| 8,277,683 B2 | 10/2012 | Deng |
| 8,337,727 B2 | 12/2012 | Chen et al. |
| 8,383,077 B2 | 2/2013 | Thackeray |
| 8,801,960 B2 | 8/2014 | Ueda et al. |
| 9,166,222 B2 | 10/2015 | Amiruddin et al. |
| 10,084,187 B2 | 9/2018 | Dai et al. |
| 10,128,494 B2 | 11/2018 | Dai et al. |
| 10,141,572 B2 | 11/2018 | Wu et al. |
| 10,164,256 B2 | 12/2018 | Wu et al. |
| 10,297,821 B2 | 5/2019 | Dai et al. |
| 10,297,823 B2 | 5/2019 | Dai et al. |
| 10,347,909 B2 | 7/2019 | Dai et al. |
| 2002/0061444 A1 | 5/2002 | Kweon et al. |
| 2002/0114995 A1† | 8/2002 | Thackeray |
| 2002/0136954 A1* | 9/2002 | Thackeray ............ C01G 23/002 |
| | | 429/231.1 |
| 2002/0182504 A1 | 12/2002 | Imachi et al. |
| 2003/0039886 A1 | 2/2003 | Zhang et al. |
| 2003/0073002 A1 | 4/2003 | Imachi et al. |
| 2003/0082445 A1 | 5/2003 | Smieth et al. |
| 2003/0134200 A1 | 7/2003 | Tanaka et al. |
| 2004/0029008 A1 | 2/2004 | Winterberg |
| 2004/0191633 A1 | 9/2004 | Johnson et al. |
| 2004/0258836 A1 | 12/2004 | Besenhard et al. |
| 2005/0026040 A1† | 3/2005 | Thackeray |
| 2005/0074675 A1 | 4/2005 | Nishijima et al. |
| 2005/0130042 A1 | 6/2005 | Liu et al. |
| 2005/0136329 A1 | 6/2005 | Howard, Jr. et al. |
| 2005/0265909 A1 | 12/2005 | Kajiya et al. |
| 2005/0271948 A1 | 12/2005 | Kang |
| 2006/0024584 A1 | 2/2006 | Kim et al. |
| 2006/0068293 A1 | 3/2006 | Kim et al. |
| 2006/0081818 A1 | 4/2006 | Ito et al. |
| 2006/0088767 A1 | 4/2006 | Li et al. |
| 2006/0099508 A1* | 5/2006 | Thackeray ............ H01M 4/131 |
| | | 429/231.1 |
| 2006/0159994 A1 | 7/2006 | Dahn et al. |
| 2006/0194118 A1 | 8/2006 | Yew et al. |
| 2006/0177739 A1 | 10/2006 | Endo et al. |
| 2006/0240326 A1 | 10/2006 | Lee |
| 2007/0141469 A1 | 6/2007 | Tokunaga et al. |
| 2007/0172739 A1 | 7/2007 | Visco |
| 2007/0202407 A1 | 8/2007 | Eberman et al. |
| 2008/0057401 A1 | 3/2008 | Mori et al. |
| 2008/0090150 A1 | 4/2008 | Nakura |
| 2008/0118847 A1 | 5/2008 | Jung et al. |
| 2008/0131778 A1 | 6/2008 | Watanabe et al. |
| 2008/0160415 A1 | 7/2008 | Wakita et al. |
| 2008/0280205 A1 | 11/2008 | Jiang et al. |
| 2008/0311473 A1 | 12/2008 | Sasaoka et al. |
| 2008/0318131 A1 | 12/2008 | Watanabe et al. |
| 2009/0092903 A1 | 4/2009 | Johnson et al. |
| 2009/0146115 A1 | 6/2009 | Xiao et al. |
| 2009/0200510 A1 | 8/2009 | Watanabe et al. |
| 2009/0202905 A1 | 8/2009 | Morita et al. |
| 2009/0239148 A1 | 9/2009 | Jiang |
| 2010/0055567 A1 | 4/2010 | Nakai et al. |
| 2010/0086853 A1 | 4/2010 | Venkatachalam et al. |
| 2010/0086854 A1 | 4/2010 | Kumar et al. |
| 2010/0151332 A1 | 6/2010 | Lopez et al. |
| 2010/0173197 A1 | 7/2010 | Li et al. |
| 2010/0304225 A1 | 12/2010 | Pascaly et al. |
| 2011/0014518 A1* | 1/2011 | Nakai ............... B22F 7/06 |
| | | 429/207 |
| 2011/0017529 A1 | 1/2011 | Kumar et al. |
| 2011/0031437 A1 | 2/2011 | Nagase et al. |
| 2011/0052981 A1 | 3/2011 | Lopez et al. |
| 2011/0053001 A1 | 3/2011 | Babic et al. |
| 2011/0076556 A1 | 3/2011 | Karthikeyan et al. |
| 2011/0076564 A1 | 3/2011 | Yu et al. |
| 2011/0089369 A1 | 4/2011 | Patoux et al. |
| 2011/0111294 A1 | 5/2011 | Lopez et al. |
| 2011/0111298 A1 | 5/2011 | Lopez et al. |
| 2011/0121240 A1 | 5/2011 | Amine |
| 2011/0136019 A1 | 6/2011 | Amiruddin et al. |
| 2011/0143174 A1 | 6/2011 | Kim |
| 2011/0165474 A1 | 7/2011 | Im et al. |
| 2011/0171371 A1 | 7/2011 | Li et al. |
| 2011/0171539 A1 | 7/2011 | Patoux et al. |
| 2011/0200864 A1 | 8/2011 | Dai |
| 2011/0200880 A1 | 8/2011 | Yu |
| 2011/0223492 A1 | 9/2011 | Sakitani et al. |
| 2011/0244331 A1 | 10/2011 | Karthikeyan et al. |
| 2011/0294006 A1* | 12/2011 | Amine ............... H01M 4/1391 |
| | | 429/209 |
| 2011/0294019 A1 | 12/2011 | Amine |
| 2012/0040247 A1 | 2/2012 | Manivannan et al. |
| 2012/0168696 A1 | 5/2012 | Huang et al. |
| 2012/0196176 A1 | 8/2012 | He et al. |
| 2012/0282522 A1* | 11/2012 | Axelbaum ............. B82Y 30/00 |
| | | 429/219 |
| 2013/0004826 A1 | 1/2013 | Li et al. |
| 2013/0011738 A1 | 1/2013 | Zhou |
| 2013/0101893 A1 | 4/2013 | Dai et al. |
| 2013/0149604 A1 | 6/2013 | Fujiki et al. |
| 2013/0252107 A1 | 9/2013 | Lee et al. |
| 2014/0087065 A1 | 3/2014 | Li et al. |
| 2014/0087254 A1 | 3/2014 | Li et al. |
| 2014/0087256 A1 | 3/2014 | Li et al. |
| 2014/0087261 A1 | 3/2014 | Li et al. |
| 2014/0141331 A1 | 5/2014 | Lee et al. |
| 2014/0158932 A1 | 6/2014 | Sun et al. |
| 2014/0175329 A1 | 6/2014 | Palma et al. |
| 2014/0234715 A1 | 8/2014 | Fasching et al. |
| 2015/0140421 A1 | 5/2015 | Ihara et al. |
| 2015/0171423 A1 | 6/2015 | Kim et al. |
| 2015/0243971 A1 | 8/2015 | Cho et al. |
| 2015/0243984 A1 | 8/2015 | Kase et al. |
| 2015/0303519 A1 | 10/2015 | Hanazaki |
| 2015/0311522 A1 | 10/2015 | Fang et al. |
| 2016/0036043 A1 | 2/2016 | Dai et al. |
| 2016/0293941 A1 | 10/2016 | Yamasaki et al. |
| 2016/0315315 A1 | 10/2016 | Olken et al. |
| 2017/0092949 A1 | 3/2017 | Dai et al. |
| 2017/0133678 A1 | 5/2017 | Ozoemena et al. |
| 2017/0214045 A1 | 7/2017 | Dai et al. |
| 2017/0263917 A1 | 9/2017 | Dai et al. |
| 2017/0263928 A1 | 9/2017 | Dai et al. |
| 2017/0263929 A1 | 9/2017 | Wu et al. |
| 2017/0346082 A1 | 11/2017 | Dai et al. |
| 2018/0062156 A1 | 3/2018 | Wu et al. |
| 2018/0079655 A1 | 3/2018 | Dai et al. |
| 2018/0083277 A1 | 3/2018 | Dai et al. |
| 2018/0083278 A1 | 3/2018 | Dai et al. |
| 2018/0114983 A9 | 4/2018 | Dai et al. |
| 2018/0114984 A9 | 4/2018 | Wu et al. |
| 2018/0123117 A9 | 5/2018 | Dai et al. |
| 2018/0215629 A1 | 8/2018 | Honma et al. |
| 2018/0257947 A9 | 9/2018 | Dai et al. |
| 2018/0294522 A1 | 10/2018 | Dai et al. |
| 2018/0351173 A1 | 12/2018 | Dai et al. |
| 2019/0027747 A9 | 1/2019 | Dai et al. |
| 2019/0067686 A1 | 2/2019 | Dai et al. |
| 2019/0074514 A1 | 3/2019 | Wu et al. |

FOREIGN PATENT DOCUMENTS

| | | |
|---|---|---|
| CN | 1770514 | 10/2006 |
| CN | 101150190 | 3/2008 |
| CN | 101223660 | 7/2008 |

(56) References Cited

FOREIGN PATENT DOCUMENTS

| | | |
|---|---|---|
| CN | 101284681 | 10/2008 |
| CN | 101510603 | 8/2009 |
| CN | 101694877 | 4/2010 |
| CN | 101734728 | 6/2010 |
| CN | 102110808 | 6/2011 |
| CN | 102299299 | 12/2011 |
| CN | 102332585 | 1/2012 |
| CN | 102368548 | 3/2012 |
| CN | 101789499 | 4/2012 |
| CN | 102479947 | 5/2012 |
| CN | 102484249 | 5/2012 |
| CN | 102544575 | 7/2012 |
| CN | 102646831 * | 8/2012 |
| CN | 102646831 A * | 8/2012 |
| CN | 102683666 | 9/2012 |
| CN | 102723459 | 10/2012 |
| CN | 102751481 | 10/2012 |
| CN | 102881891 | 1/2013 |
| CN | 103151520 | 6/2013 |
| CN | 103296249 | 9/2013 |
| CN | 102386381 | 1/2014 |
| CN | 103560250 | 2/2014 |
| CN | 103872315 | 6/2014 |
| CN | 103972493 | 8/2014 |
| CN | 104022280 | 9/2014 |
| CN | 104466099 | 3/2015 |
| CN | 104868122 | 8/2015 |
| CN | 106450211 | 2/2017 |
| DE | 10352063 | 6/2005 |
| JP | 4-267053 | 9/1992 |
| JP | H-10-087327 | 4/1998 |
| JP | 2005-101003 | 4/2005 |
| JP | 2005-289700 | 10/2005 |
| JP | 2009-4311 | 1/2009 |
| KR | 10-2002-0063501 | 8/2002 |
| KR | 10-2014-0073856 | 6/2014 |
| KR | 101731473 | 4/2017 |
| TW | 201126798 | 8/2011 |
| TW | 201342695 | 10/2013 |
| WO | WO 2004/045015 | 5/2004 |
| WO | WO 2004/107480 | 12/2004 |
| WO | WO 2008/069351 | 6/2008 |
| WO | WO 2009/120515 | 10/2009 |
| WO | WO 2010/011569 | 1/2010 |
| WO | WO 2010/139404 | 12/2010 |
| WO | WO 2011/020073 | 2/2011 |
| WO | WO 2011/054441 | 5/2011 |
| WO | WO 2013/048048 | 4/2013 |
| WO | WO 2014/014913 | 1/2014 |
| WO | WO 2014/119165 | 8/2014 |
| WO | WO 2016/143572 | 9/2016 |

OTHER PUBLICATIONS

Zhao et al., "Progress of Research on the Li-rich Cathode Materials $xLi_2MnO_3 \cdot (1-x)LiMO_2$ (M=Co, Fe, $Ni_{1/2}Mn_{1/2}$ . . . ) for Li-ion Batteries," *Journal of Inorganic Materials*, vol. 26(7), pp. 673-679, Jul. 2011.

Dou et al., "Synthesis and electrochemical properties of layered LiNi0.5-xMn0.5-xCo2xO2 for lithium-ion battery from nickel manganese cobalt precursor," *J Solid State Electrochem*, (2011), vol. 15, pp. 399-404.

Li, "Layered Oxides Li1+xM1-xO2 (M = Ni, Mn, Co, Al) As Cathode Materials for Rechargeable Lithium Ion Batteries," Dissertation, Submitted in partial fulfillment of the requirements for the degree of Doctor of Philosophy in Materials Science and Engineering in the Graduate School of Binghamton University State University of New York, Jul. 22, 2011, Published by UMI Dissertation Publishing, UMI Number: 3474185, 158 pages.

Rodrigues et al., "A novel coprecipitation method towards the synthesis of NiXMnXCo(1-2X)(OH)2 for the preparation of lithium metal oxides," *J Solid State Electrochem*, 2012, vol. 16, pp. 1121-1132.

Cho et al., "LiCoO2 Cathode Material That Does Not Show a Phase Transition from Hexagonal to Monoclinic Phase," 2001, *Journal of the Electrochemical Society*, vol. 148, No. 10, pp. A1110-A1115.

Jung et al., "Enhanced Stability of LiCoO2 Cathodes in Lithium-Ion Batteries Using Surface Modification by Atomic Layer Deposition," 2010, *Journal of the Electrochemical Society*, vol. 157, No. 1, pp. A75-A81.

Lee et al., "Characteristics of LiCoO2 and Its Precursor Synthesized by a Uniform Precipitation Method," Electrochemical and Solid-State Letters, 2010, vol. 13, No. 7, pp. A81-A84.

Kobayashi et al., "Study on the Crystal and Electronic Structures of the Layered Li2Mo3-LiMo2 Materials in Li De-Intercalation Process," *Photon Factory Activity Report*, 2012, vol. 29, No. 2011, 1 pp.

Giordano et al., "Metal Nitride and Metal Carbide Nanoparticles by a Soft Urea Pathway," *Chem. Mater.*, 2009, vol. 21, pp. 5136-5144.

Qian et al., "Lithium Lanthanum Titanium Oxides: A Fast Ionic Conductive Coating for Lithium-Ion Battery Cathodes," *Chemistry of Materials*, 2012, 24 (14), pp. 2744-2751.

Reddy et al., "Effects of LLTO coating on high temperature cycle life performance of LiMn2O4 cathode material," Abstract #382, 2012, The Electrochemical Society, 2 pages.

Davison et al., "Low Cost, Novel Methods for Fabricating All-Solid-State Lithium Ion Batteries," A Major Qualifying Project Submitted to the Faculty of Worcester Polytechnic Institute, Apr. 23, 2012, 126 pages.

Lee et al., "The Effects of Li-La-Ti-O Coating on the Properties of Li[Ni0.3Co0.4Mn0.3]O2 Cathode Material," Journal of the Korean Institute of Electrical and Electronic Material Engineers, Oct. 2009, vol. 22, No. 10, pp. 890-896.

Lee et al., "The Effect of Coating Thickness on the Electrochemical Properties of a Li-La-Ti-O-coated Li[Ni0.3Co0.4Mn0.3]O2 Cathode," Bull. Korean Chem. Soc., 2010, vol. 31, No. 11, pp. 3233-3237.

Hu et al., "Enhanced electrochemical performance of LiMn2O4 cathode with a Li0.34La0.51TiO3-caoted layer," *RSC Advances*, 2015. vol. 5, pp. 17592-17600.

Fergus et al., "Recent Developments in Cathode Materials for Lithium Ion Batteries," *Journal of Power Sources*, vol. 195, No. 4, 23010, pp. 939-954.

Gille G. et al., "Cathode Materials for Rechargeable Batteries-Preparation, Structure-Property Relationships and Performance," *Solid State Ionics*, vol. 148, No. 3-4, 2002, pp. 269-282.

Periasamy et al., "High Voltage and High Capacity Characteristics of LiNi1/3Co1/3Mn1/3O2 Cathodes for Lithium Battery Applications," *Int. J. Electrochecm Soc.*, vol. 2, 2007, pp. 689-699.

Manthiram Lab Highlights, "Passivation of Spinel Cathode Surface through Self-Segregarion of Iron," May 7, 2010.

Cerion Power, "Our Power Business," www.cerionenterprises.com/companies_and_applications/power, accessed Sep. 8, 2011.

ETV Motors, "High5ive advanced high-voltage cells," www.etvemotors.com/advanced-battery.htm, accessed Sep. 8, 2011.

Wolfenstine et al., US Army RDECOM, "High Cycle Life Cathode for High Voltage (5V) Lithium Ion Batteries.".

Sullivan, "Safe High Voltage Cathode Materials for Pulsed Power Applications," Navy STTR FY2011A—Topic N11A-T035, www.navy.sbir.com/n11_A/navst11-035.htm, accessed Sep. 8, 2011.

Xu, US Army RDECOM, "Electrolyte for Next Generation 5V Li-Ion Batteries.".

Ghosh et al., "Block Copolymer Solid Battery Electrolyte with High Li-Ion Transference Number," *Journal of the Electrochemical Society*, 2010, vol. 157, No. 7, pp. A846-A849.

Abu-Lebdeh et al., High-Voltage Electrolytes Based on Adiponitrile for Li-Ion Batteries, *Journal of the Electrochemical Society*, 2009, vol. 156, No. 1, pp. A60-A65.

Jow et al., "High Voltage Electrolytes for Li-ion Batteries," U.S. Research Laboratory, Presentation, May 2011.

Lucht, University of Rhode Island, "Development of Electrolytes for Lithium-ion Batteries," Presentation, May 11, 2001.

Zhang et al, Argonne National Laboratory, Vehicle Technologies Program Annual Merit Review and Peer Evaluation Meeting, "High Voltage Electrolyte for Lithium Batteries," Presentation, Jun. 9-13, 2011.

(56) References Cited

OTHER PUBLICATIONS

David Howell, US Department of Energy, "Vehicle Technologies Program," 2011 Annual Merit Review and Peer Evaluation Meeting, Presentation, May 9-13, 2011.
Fey et al., Preparation and electrochemical properties of high-voltage cathode maters, LiMyNi0.5-yMn1.5O4 (M = Fe, Cu, Al, Mg; y = 0.0-0.4), *Journal of Power Sources*, 2003, vol. 115, pp. 332-345.
Kawai et al., "High-voltage lithium cathode materials," Journal of Power Sources, 1999, vols. 81-82, abstract only.
Huang et al., "Lithium cobalt phosphate: a high voltage lithium ion cathode material," Valence Technologies.
"Award Details," SBIR/STTR, www.sbir.gov/sbirsearch/detail/ 233700, accessed Sep. 8, 2011.
Ju et al., "LiCo1-xAlxO2 (0≤x≤0.05) cathode powders prepared from the nanosized Co1-xAlxOy precursor powders," *Materials Chemistry and Physics*, 112 (2008), pp. 536-541.
Sun et al., "The Role of AlF3 Coatings in Improving Electrochemical Cycling of Li-Enriched Nickel-Manganese Oxide Electrodes for Li-Ion Batteries," *Adv. Mater.*, 2012, vol. 24, pp. 1192-1196.
Patoux et al., "Layered Manganese Oxide Intergrowth Electrodes for Rechargeable Lithium Batteries. 2. Substitution with Al," *Chem. Mater.*, 2005, vol. 17, pp. 1044-1054.
Myung et al., "Role of Alumina Coating on Li—Ni—Co—Mn—O Particles as Positive Electrode Material for Lithium-Ion Batteries," *Chem. Mater.*, 2005, vol. 17, pp. 3695-3704.
Rouse et al., "Electrochemical Studies of Single Crystals of Lithiated Nickel Oxide," *Journal of the Electrochemical Society*, Feb. 1966, vol. 113, No. 2, pp. 184-190.
Jin et al., "Observation of Bulk Superconductivity in $Na_x CoO_2 \cdot yH_2 O$ and $Na_x CoO_2 \cdot yD_2 O$ Powder and Single Crystals," Phys Rev Lett, 2003, vol. 91, Issue 21, id. 217001, 4 pages.
Franger et al., "Chemistry and Electrochemistry of Low-Temperature Manganese Oxides as Lithium Intercalation Compounds," *Journal of the Electrochemical Society*, 2000, vol. 147, No. 9, pp. 3226-3230.
Lu et al., "Layered $Li[Ni_x Co_{1-2x} Mn_x]O_2$ Cathode Materials for Lithium-Ion Batteries," *Electrochemical and Solid-State Letters*, 2001, vol. 4, No. 12, pp. A200-A203.
Shinova et al., "Cationic distribution and electrochemical performance of $LiCo_{1/3}Ni_{1/3}Mn_{1/3}O_2$ electrodes for lithium-ion batteries," 2008, *Solid State Ionics*, vol. 179, pp. 2198-2208.
Koyama et al., "First principles study of dopant solubility and defect chemistry in Li CoO2," *J. Mater. Chem A.*, 2014, vol. 2, pp. 11235-11245.
Arunkumar et al., "Chemical and structural instability of the chemically delithiated (1-z) $Li[Li_{1/3}Mn_{2/3}O_2$ (z) $Li[Co_{1-y}Ni_y]O_2$ (0 ≤ y ≤ 1 and 0 ≤ z ≤ 1) solid solution cathodes," *Journal of Materials Chemistry*, 2008, vol. 18, pp. 190-198.
Zeng et al., "Cation ordering in Li[NixMnxCo(1-2x)]O-2-layered cathode materials: A nuclear magnetic resonance (NMR), pair distribution function, X-ray absorption spectroscopy, and electrochemical study," *Chemistry of Materials*, 2007, vol. 19. No. 25, pp. 6277-6289.
Zeng et al, "Investigation of the Structural Changes in Li[NiyMnyCo(1-2y)]O-2 (y=0.05) upon Electrochemical Lithium Deintercalation," *Chemistry of Materials*, 2010, vol. 22, No. 3, pp. 1209-1219.
Saadoune et al., "LiNi0.1Mn0.1Co0.8O2 electrode material: Structural changes upon lithium electrochemical extraction," *Electrochimica Acta*, 2010, vol. 55, No. 18, pp. 5180-5185.
Bentaleb et al., "On the LiNi0.2Mn0.2Co0.6O2 positive electrode material," *Journal of Power Sources*, 2010, vol. 195, No. 5, pp. 1510-1515.
Ben Kamel et al, "Local Structure and electrochemistry of LiNiyMnyCo1-2y)O2 electrode materials for Li-ion batteries," *Ionics*, 2008, vol. 14, No. 2, pp. 89-97.
Stoyanova et al., "High-Frequency Electron Paramagnetic Resonance Analysis of the Oxidation State and Local Structure of Ni and Mn Ions in Ni,Mn-Codoped LiCoO2," *Inorganic Chemistry*, 2010, vol. 49, No. 4, pp. 1932-1941.

Menetrier et al., "The insulator-metal transition upon lithium deintercalation from LiCoO2: electronic properties and Li-7 NMR Study," *Journal of Materials Chemistry*, 1999, vol. 9, No. 5, pp. 1135-1140.
Seong-Min Bak et al, "Structural Changes and Thermal Stability of Charged LiNixMnyCozO2 Cathode Materials Studied by Combined in Situ Time-Resolved XRD and Mass Spectroscopy," *ACS Appl. Mater. Interfaces*, 2014, vol. 6, pp. 22594-22601.
Robertson et al., "Layered $Li_x Mn_{1-y} Co_y O_2$ Intercalation Electrodes—Influence of Ion Exchange on Capacity and Structure upon Cycling," *Chem. Mater.*, 2001, vol. 13, pp. 2380-2386.
Wu et al., "Effect of Al3+ and F− Doping on the Irreversible Oxygen Loss from Layered Li[Li0.17Mn0.58Ni0.25]O2 Cathodes," *Electrochemical and Solid-State Letters*, 2007, vol. 10, No. 6, pp. A151-A154.
Li et al, "Effects of fluorine doping on structure, surface chemistry, and electrochemical performance of LiNi0.8Co0.15Al0.05O2," *Electrochimica Acta*, 2015, vol. 174, pp. 1122-1130.
Cho et al., "Exploring Lithium Deficiency in Layered Oxide Cathode for Li-Ion Battery," *Advanced Sustainable Systems*, 2017, 1700026, 10 pages.
Lee et al., "Surface modification of LiNi0.5Mn1.5O4 cathodes with ZnAl2O4 by a sol-gel method for lithium ion batteries," *Electrochimica Acta*, 2014, vol. 115, pp. 326-331.
Kim et al., "Effect of fluorine on Li[Ni1/3Co1/3Mn1/3]O2-zFz as lithium intercalation material," *Journal of Power Sources*, 2005, vol. 146, pp. 602-605.
Yue et al., "The enhanced electrochemical performance of LiNi0.6Co0.2Mn0.2O2 cathode materials by low temperature fluorine substitution," *Electrochimica Acta*, 2013, vol. 95, pp. 112-118.
Wang et al., "Effect of surface fluorine substitution on high voltage electrochemical performances of layered LiNi0.5Co0.2Mn0.3O2 cathode materials," *Applied Surface Science*, 2016, vol. 371, pp. 172-179.
Tang et al., "Synthesis and characterization of LiFePO4 coating with aluminum doped zinc oxide," *Trans. Nonferrous Met. Soc. China*, 2013, vol. 23, pp. 451-455.
Myung et al., "Functionality of Oxide Coating for Li[Li0.05Ni0. 4Co0.15Mn0.4])2 as Positive Electrode Materials for Lithium-Ion Secondary Batteries," *J. Phys. Chem. C*, 2007, vol. 111, pp. 4061-4067.
Liu et al., "Investigation the electrochemical performance of Li1. 2Ni0.2Mn0.6O2 cathode material with ZnAl2O4 coating for lithium ion batteries," *Journal of Alloys and Compounds*, 2016, vol. 685, pp. 523-532.
Kim et al., "Improvement of High-Voltage Cycling Behavior of Surface-Modified Li[Ni1/3Co1/3Mn1/3]O2 Cathodes by Fluorine Substitution for Li-Ion Batteries," *J. Electrochem. Soc.*, 2005, vol., 152, issue 9, pp. A1707-A1713.
Choi et al., "[27] Al NMR Chemical Shifts in Oxide Crystals: A First-Principles Study," *J. Phys. Chem. C*, 2009, 113 (9), pp. 3869-3873.
Lee et al., "Solid-state NMR Studies of Al-doped and Al2O3-coated LiCoO2," *Electrochimica Acta*, Nov. 30, 2004, vol. 50, Issues 2-3, pp. 491-494.
Chen et al., "Role of surface coating on cathode materials for lithium-ion batteries," *Journal of Materials Chemistry*, 2010, 20, 7606-7612.
Wenbin, Luo, "Effect of Al, Mg and Mn-Mg Doping on the Structure, Electrochemistry and Thermal Stability of LiCoO2 and LiNi1/3Mn1/3Co1/3O2," China Doctoral Dissertations Full-text Database Engineering Technology Part II, Nov. 15, 2010. (Translation provided by MultiLing).
Xinran, Cui, "Preparation and Properties of Al(3+) Doped Lithium-rich Layered Cathode Material Li[Co0.3Li0.23Mn0.47]O2," China Doctoral Dissertations Full-text Database Engineering Technology Part II, Oct. 15, 2012. (Translation provided by MultiLing).
Arunkumar,T.A., et al., Factors influencing the irreversible oxygen loss and reversible capacity in layered Li[Li1/3Mn2/3]O2-Li[M]O2 (M=Mn0.5-yNi0.5-yCo2y and Ni1-yCoy) solid solutions, Chem. Mater., vol. 19 (2007) pp. 3067-3073.†
Thackeray, M.M., et al., Li2MnO3-stabilized LiMO2 (M=Mn, Ni, Co) electrodes for lithium-ion batteries, Journal of Materials Chemistry, vol. 17 (2007), pp. 3112-3125.†

(56) References Cited

OTHER PUBLICATIONS

Numata, K., et al., Synthesis and characterization of layer structured solid solutions in the system of LiCoO2-Li2MnO3, Solid State Ionics, vol. 117 (1999), pp. 257-263.†

\* cited by examiner
† cited by third party

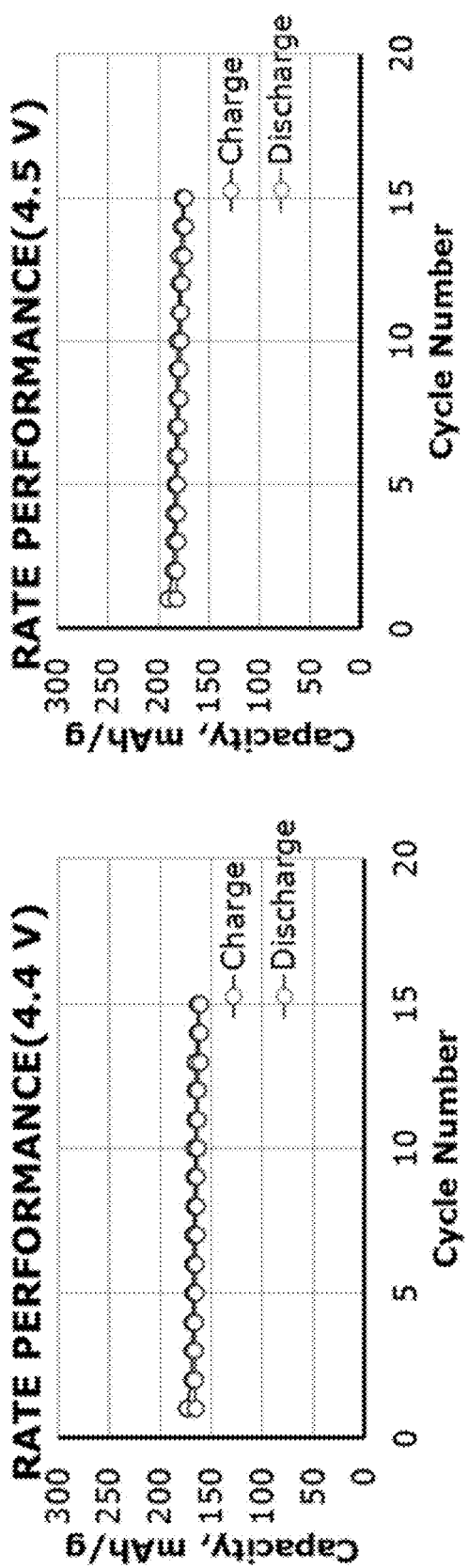
FIG. 10D
FIG. 10E
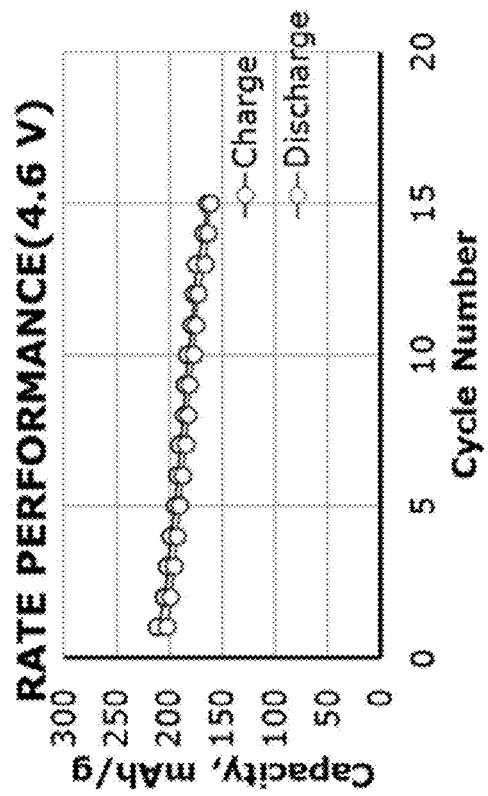
FIG. 10F

PORTABLE ELECTRONIC DEVICE 1300

HIGH VOLTAGE, HIGH VOLUMETRIC ENERGY DENSITY LI-ION BATTERY USING ADVANCED CATHODE MATERIALS

RELATED APPLICATION

This application claims the benefit of U.S. Provisional Application No. 61/777,510, entitled "High Voltage, High Volumetric Density Li-Ion Battery Using Advanced Cathode Materials," by inventor Hongli Dai, filed 12 Mar. 2013, which is hereby incorporated by reference.

U.S. GOVERNMENT LICENSE RIGHTS

This invention was made with U.S. government support under WFO Proposal No. 85F59. The U.S. government has certain rights in the invention.

BACKGROUND

Field

The present embodiments generally relate to rechargeable batteries. More specifically, the present embodiments relate to the design of a high voltage, high volumetric energy density lithium-ion battery using advanced cathode materials.

Related Art

Rechargeable batteries are widely used for energy storage in a variety of consumer, medical, aerospace, defense, and/or transportation applications. The most commonly used type of rechargeable battery is a lithium battery, which can include a lithium-ion or a lithium-polymer battery. As battery-powered devices become increasingly small and more powerful, batteries powering these devices need to store more energy in a smaller volume. Consequently, use of battery-powered devices may be facilitated by mechanisms for improving the volumetric energy densities of batteries in the devices.

SUMMARY

The disclosed embodiments provide a battery cell. The battery cell includes an anode containing an anode current collector and an anode active material disposed over the anode current collector. The battery cell also includes a cathode containing a cathode current collector and a cathode active material disposed over the cathode current collector. The cathode active material has a composition represented by $xLi_2MO_3 \cdot (1-x)LiCo_yM'_{(1-y)}O_2$.

In some embodiments, M is at least one of manganese, titanium, ruthenium, and zirconium.

In some embodiments, y=1.00, M' is not present, and the composition is $xLi_2MO_3 \cdot (1-x)LiCoO_2$.

In some embodiments, $0.5 \leq y < 1.00$ and M' is at least one of a monovalent cation, a divalent cation, a trivalent cation, a tetravalent cation, and a ruthenium cation.

In some embodiments, M or M' contains a mixture of metal cations.

In some embodiments, the stoichiometric numbers of the metal cations in the mixture are not equal.

In some embodiments, $0.01 \leq x \leq 0.50$.

In some embodiments, the composition is formed using at least one of a mixed-metal hydrated hydroxide precursor made using a solution co-precipitation method and a lithium addition solid-state reaction.

In some embodiments, y=1.00, M is Manganese (Mn), and the composition is $xLi_2MnO_3 \cdot (1-x)LiCoO_2$.

In some embodiments, the amount of lithium that can be reversibly extracted from the cathode active material is greater than 165 mAh/g.

In some embodiments, the amount of lithium that can be reversibly extracted from the cathode active material is greater than 200 mAh/g.

BRIEF DESCRIPTION OF THE FIGURES

The patent or application file contains at least one drawing executed in color. Copies of this patent or patent application publication with color drawing(s) will be provided by the Office upon request and payment of the necessary fee.

FIG. 10D shows a plot of capacity versus cycle number for a battery cell in accordance with the disclosed embodiments.

FIG. 10E shows a plot of capacity versus cycle number for a battery cell in accordance with the disclosed embodiments.

FIG. 10F shows a plot of capacity versus cycle number for a battery cell in accordance with the disclosed embodiments.

In the figures, like reference numerals refer to the same figure elements.

DETAILED DESCRIPTION

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

Lithium cathode active materials containing Co and Mn (e.g., $LiNi_{1/3}Mn_{1/3}Co_{1/3}O_2$ (NMC)) have been synthesized for use in rechargeable batteries, specifically lithium cells and batteries. Typically, battery cells made using these cathode active materials suffer from low volumetric energy density, high-percent capacity irreversibility in the first cycle, capacity degradation over cycling and low rate. The present embodiments target these shortcomings and offer excellent volumetric energy density, cycle life and high rate discharging capability.

Figure 1:
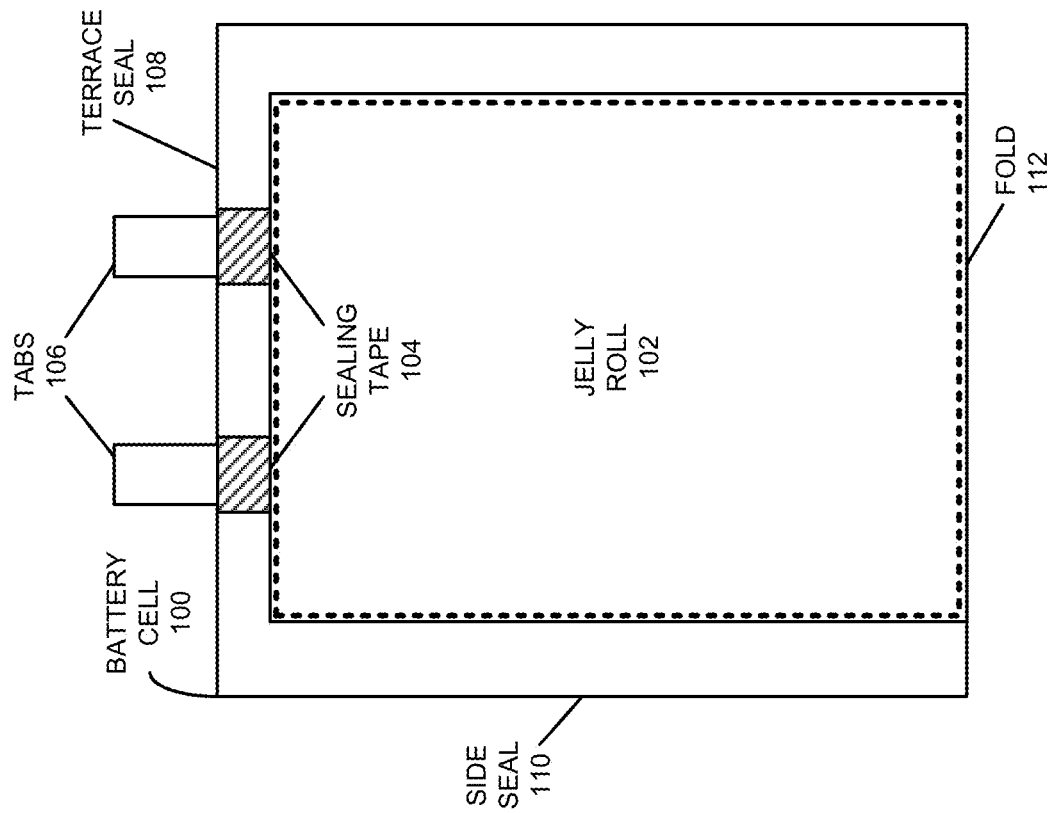
FIG. 1 shows a top-down view of a battery cell in accordance with the disclosed embodiments.

FIG. 1 shows a top-down view of a battery cell 100 in accordance with an embodiment. Battery cell 100 may correspond to a lithium-ion or lithium-polymer battery cell that is used to power a device used in a consumer, medical, aerospace, defense, and/or transportation application. Battery cell 100 includes a jelly roll 102 containing a number of layers which are wound together, including a cathode with an active coating, a separator, and an anode with an active coating. More specifically, jelly roll 102 may include one strip of cathode material (e.g., aluminum foil coated with a lithium compound) and one strip of anode material (e.g., copper foil coated with carbon) separated by one strip of separator material (e.g., conducting polymer electrolyte). The cathode, anode, and separator layers may then be wound on a mandrel to form a spirally wound structure. Alternatively, the layers may be stacked and/or used to form other types of battery cell structures, such as bi-cell structures. Jelly rolls are well known in the art and will not be described further.

During assembly of battery cell 100, jelly roll 102 is enclosed in a flexible pouch, which is formed by folding a flexible sheet along a fold line 112. For example, the flexible sheet may be made of aluminum with a polymer film, such as polypropylene. After the flexible sheet is folded, the flexible sheet can be sealed, for example by applying heat along a side seal 110 and along a terrace seal 108. The flexible pouch may be less than 120 microns thick to improve the packaging efficiency and/or energy density of battery cell 100.

Jelly roll 102 also includes a set of conductive tabs 106 coupled to the cathode and the anode. Conductive tabs 106 may extend through seals in the pouch (for example, formed using sealing tape 104) to provide terminals for battery cell 100. Conductive tabs 106 may then be used to electrically couple battery cell 100 with one or more other battery cells to form a battery pack. For example, the battery pack may be formed by coupling the battery cells in a series, parallel, or series-and-parallel configuration. The coupled cells may be enclosed in a hard case to complete the battery pack, or the coupled cells may be embedded within the enclosure of a portable electronic device, such as a laptop computer, tablet computer, mobile phone, personal digital assistant (PDA), digital camera, and/or portable media player.

Figure 2:
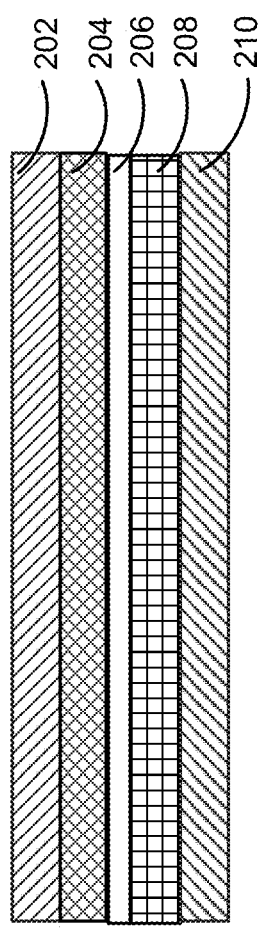
FIG. 2 shows a set of layers for a battery cell in accordance with the disclosed embodiments.

FIG. 2 shows a set of layers for a battery cell (e.g., battery cell 100 of FIG. 1) in accordance with the disclosed embodiments. The layers may include a cathode current collector 202, cathode active coating 204, separator 206, anode active coating 208, and anode current collector 210. Cathode current collector 202 and cathode active coating 204 may form a cathode for the battery cell, and anode current collector 210 and anode active coating 208 may form an anode for the battery cell. The layers may be wound or stacked to create the battery cell.

As mentioned above, cathode current collector 202 may be aluminum foil, cathode active coating 204 may be a lithium compound, anode current collector 210 may be copper foil, anode active coating 208 may be carbon, and separator 206 may include a conducting polymer electrolyte. More specifically, cathode active coating 204 may include a cathode active material composition represented by $xLi_2MO_3 \cdot (1-x)LiCo_yM'_{(1-y)}O_2$. In the composition, x may range from 0.01 to less than 1.00 ($0.01 \leq x \leq 1.00$), and y may range from 0.50 to 1.00 ($0.50 \leq y \leq 1.00$). M may be Mn, Ti, Ru, Zr or a mixture thereof, and M', if present, may include one or more metal cations selected preferably from one or more monovalent, divalent, trivalent or tetravalent cations and Ru, examples of which are $Li^+$, $Ni^{2+}$, $Ni^{3+}$, $Cu^+$, $Cu^{2+}$, $Mg^{2+}$, $Zn^{2+}$, $B^{3+}$, $Ga^{3+}$, $Al^{3+}$, $Mn^{3+}$, $Mn^{4+}$, $Sn^{4+}$, $Sn^{4+}$, $Ti^{4+}$, and/or $Ru^{4+/5+/6+}$. If M is a mixture of metal cations, the stoichiometric numbers of the metal cations do not have to be equal. If M' is a mixture of metal cations, the stoichiometric numbers of the metal cations do not have to be equal as long as their sum total (1-y) ranges from 0 to 0.50 ($0 \leq (1-y) < 0.50$). This new cathode active material can include 1% to 50% $Li_2MO_3$ ($0.01 \leq x \leq 0.50$), preferably 1% to 30% ($0.01 \leq x \leq 0.30$).

Such active material compositions can be used in rechargeable lithium cells and batteries. Unlike conventional active materials, this new cathode active material uses $Li_2MO_3$ to stabilize its structure during repeated lithium intercalation and de-intercalation. The resulting structure contains a $Li_2MO_3$ domain, which inherently contains the $LiM_6$ component that stabilizes the entire cathode active material structure during battery charging and discharging. This makes it possible to reversibly extract more lithium ion from the structure. For example, the disclosed cathode active material composition may provide greater than 60% reversible lithium-ion extraction (reversible capacity of cathode active material >165 mAh/g), and possibly greater than 75% reversible lithium-ion extraction (reversible capacity of cathode active material >200 mAh/g) of the cathode active material's theoretical capacity.

In the disclosed embodiments, the $Li_2MO_3$-stabilized lithium transition metal oxide is preferably synthesized from a mixed-metal hydrated hydroxide precursor previously made by a solution co-precipitation method. This method provides for the best homogeneous mix of transition metals in the intercalation host. In a second method, the material is synthesized using a solid-state reaction.

The following examples describe the principles of the disclosed embodiments as contemplated by the inventors, but they are not to be construed as limiting examples.

Example 1

A layered material with composition represented by $0.02Li_2MnO_3 \cdot 0.98LiNi_{0.021}Co_{0.979}O_2$, was made by the solid-state reaction of 9.3623 g of $LiOH \cdot H_2O$ and 19.6491 g of hydrated $Ni_{0.02}Mn_{0.02}Co_{0.96}(OH)_2 \cdot nH_2O$ hydroxide pink powder made by a co-precipitation method. This constitutes a material with Ni+3 and Mn+4 as nominal oxidation states. The powders were mixed in an orbital mixer. Following mixing, the mixed powder was transferred to an alumina high-temperature tray and heated first in flowing oxygen gas at 500° C. for 10 hours. The ramp rate of the furnace for this first step was 2° C. per minute. The sample was cooled in the furnace after it was turned off. The sample was subsequently ground by mortar and pestle, then sieved and re-fired at 1050° C. in flowing oxygen gas for 5 hours; the ramp rate was 2° C. per minute, and after firing was completed, a natural cool rate of the furnace turned off was used. The final sintered black powder was broken up and ground by mortar and pestle, then sieved for use in an electrochemical test as a cathode active material, as described in further detail below with respect to Example 4.

Figure 3:
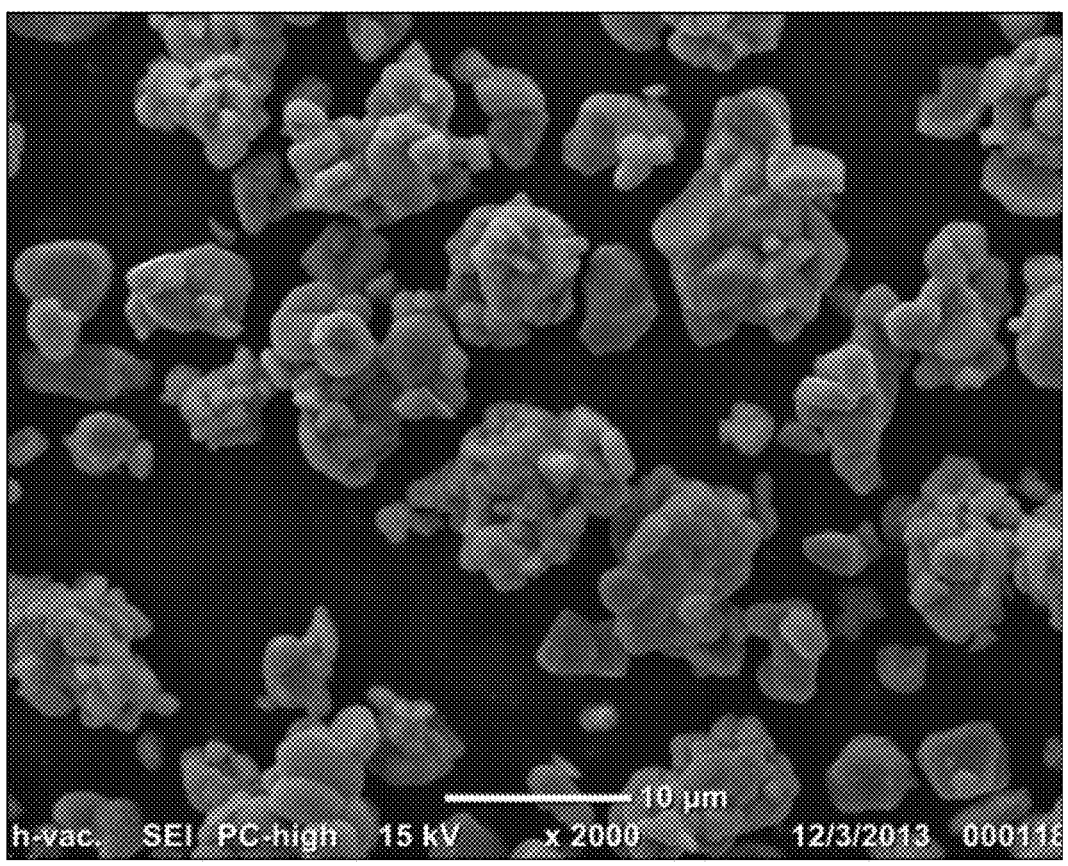
FIG. 3 shows a scanning electron micrograph (SEM) of a cathode active material composition in accordance with the disclosed embodiments.

Scanning electron micrographs (SEMs) of the final powder were taken using a JEOL Nikon Neoscope SEM instrument. An exemplary micrograph is shown in FIG. 3. Primary particle sizes range from about 20 to about 100 nm in size; secondary particle sizes range from about 10 to about 16 microns in size.

Figure 4:
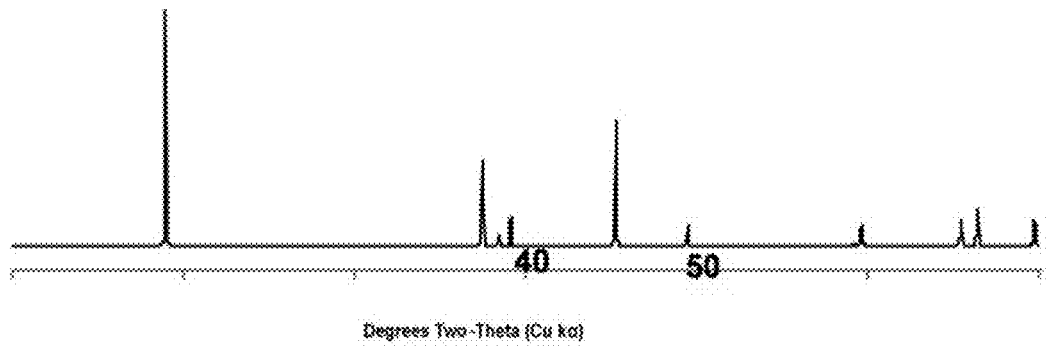
FIG. 4 shows an X-ray powder diffraction (XRD) of a cathode active material composition in accordance with the disclosed embodiments.

The sample was characterized by X-ray powder diffraction (XRD) at the Argonne National Laboratory synchrotron X-ray research facility, also known as the Advanced Photon Source (APS). The data was converted to $Cuk_\alpha$ radiation. As shown in FIG. 4, the XRD pattern of the sample matches the JCPDS hexagonal layered structure of lithium cobalt oxide (LCO).

Figure 5:
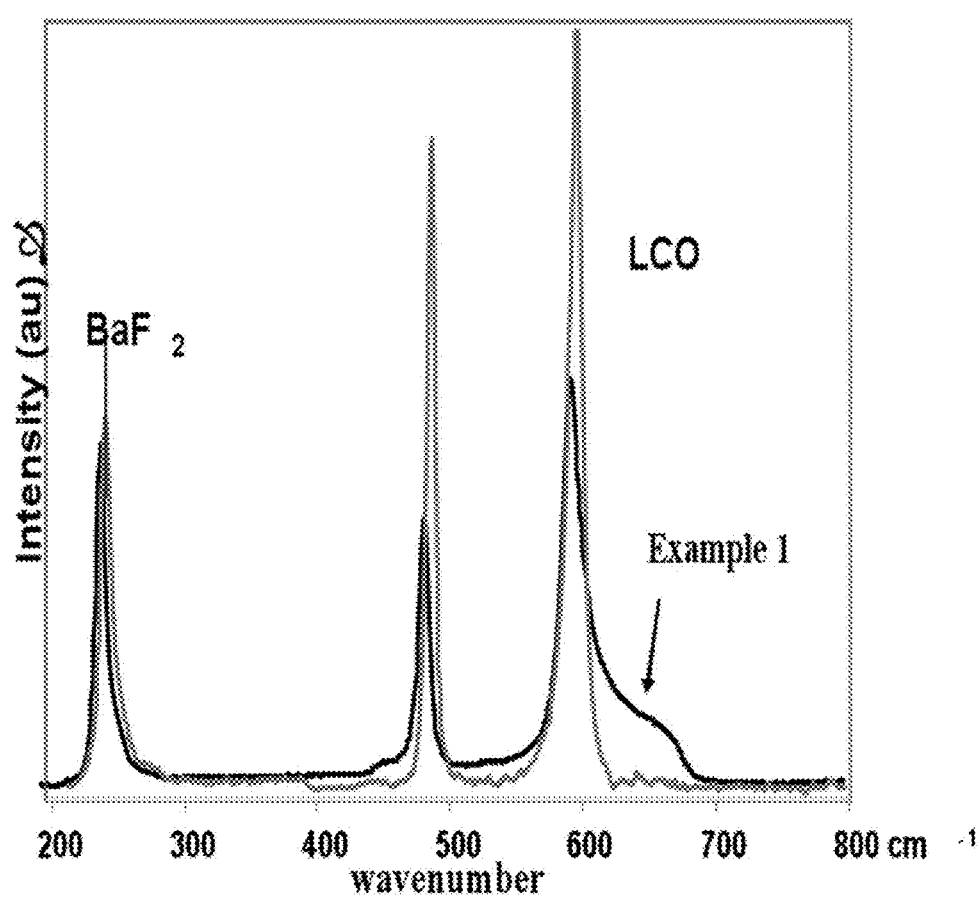
FIG. 5 shows a Raman vibrational spectrum of a cathode active material composition in accordance with the disclosed embodiments.

The sample was characterized by Raman spectroscopy on an InVia Renishaw Raman Microprobe. FIG. 5 shows the Raman vibrational spectrum of the sample $0.02Li_2MnO_3 \cdot 0.98LiNi_{0.021}Co_{0.979}O_2$ synthesized in Example 1. The result shows a shoulder mode at 650 $cm^{-1}$ and another of lesser intensity at ~450 $cm^{-1}$. For reference the LCO Raman spectrum is also plotted. Note that these shoulders do not appear in the pure hexagonal layered structure of LCO. These shoulder vibrations, therefore, are indicative of low energy transition metal oxygen modes associated with Example 1 material.

Example 2

Figure 6:
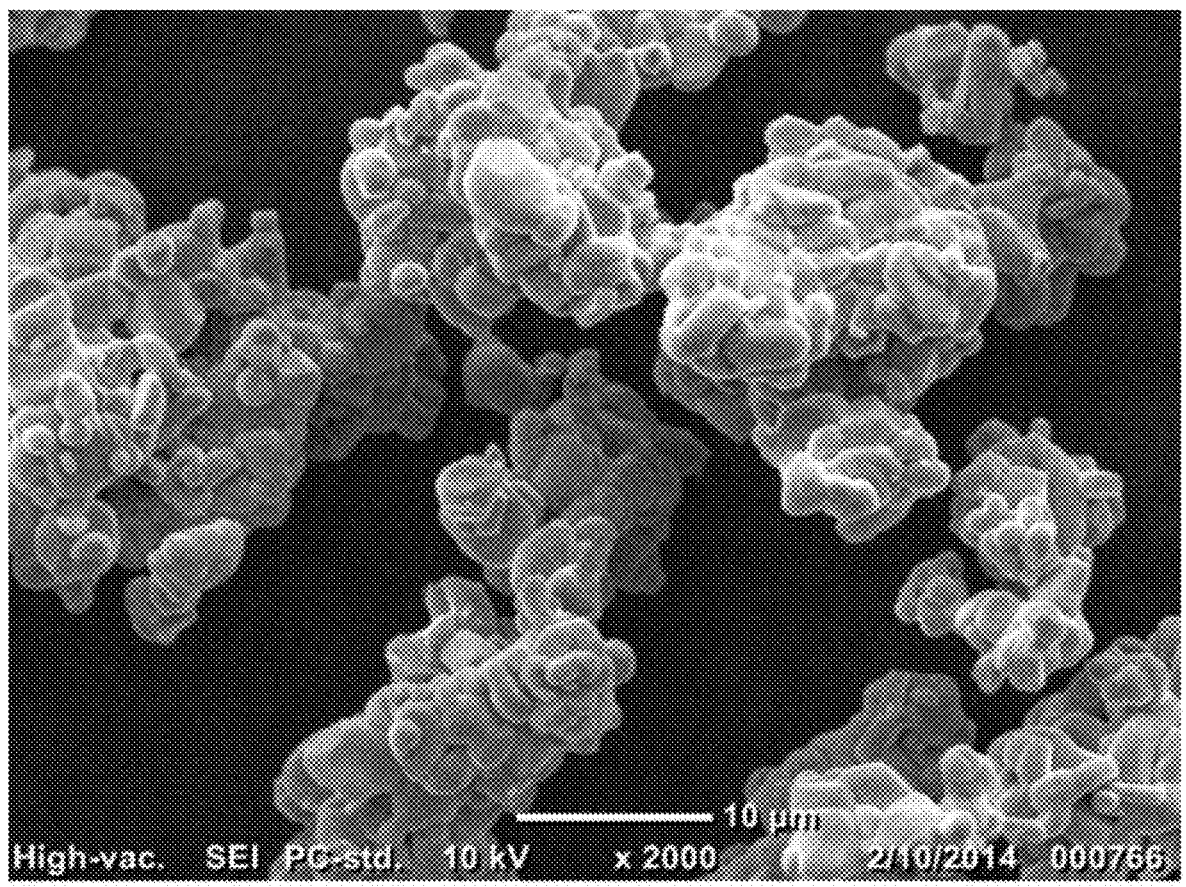
FIG. 6 shows an SEM of a cathode active material composition in accordance with the disclosed embodiments.

A layered material with composition represented by $0.04Li_2MnO_3 \cdot 0.96LiCoO_2$ was made by the solid-state reaction of 4.63 g of $LiOH \cdot H_2O$ and 9.0 of hydrated $Mn_{0.04}Co_{0.96}(OH)_2 \cdot nH_2O$ hydroxide pink powder made by a co-precipitation method. This composition is representative of a Ni-free, Mn+4 nominal oxidation state. The powders were mixed in an orbital mixer. Following mixing, the mixed powder was transferred to an alumina high-temperature tray and heated first in air at 500° C. for 10 hours. The ramp rate of the furnace for this first step was 2° C. per minute. The sample was cooled in the furnace after it was turned off. The sample was subsequently ground by mortar and pestle, then sieved and re-fired at 1050° C. in air for 5 hours; the ramp rate was 2° C. per minute, and after firing was completed, a natural cool rate of the furnace turned off was used. The final sintered black powder was broken up and ground by mortar and pestle, then sieved for use in an electrochemical test as a cathode active material. SEMs of the final powder were taken using a JEOL Nikon Neoscope SEM instrument. An exemplary micrograph is shown in FIG. 6. Secondary particle sizes range from about 10 to about 30 microns in size.

Example 3

The cathode active material synthesized in Example 1 was processed into electrode laminates. Each electrode laminate was created by making a slurry of 90 wt. % cathode active material, 5 wt. % carbon and 5 wt. % polyvinylidene fluoride (PVDF) binder in an NMP (N-methyl-pyrrolidone) solvent. The slurry was cast onto an aluminum current collector sheet using a doctor blade. The wet electrode laminate was first dried at 75° C. for ~4 hours in an air oven, followed by heated vacuum drying at 75° C. overnight (~16 hours). The electrode laminate was calendared. Electrodes of size 9/16" diameter were punched out from the aluminum sheet and built into size 2032 coin cells (Hohsen, Japan). The coin cells contained lithium as counter electrodes (e.g., anodes) and an electrolyte mixture of 3:7 (wt., EC:EMC) solvent and 1.2 M $LiPF_6$ salt. The separator was Celgard 2325 tri-layer polypropylene.

Cells were placed on a Maccor Series 2000 tester and cycled in galvanostatic mode at room temperature with various voltage windows: 4.4V to 2.75V, 4.5V to 2.75V, 4.6V to 2.75V, and 4.7V to 2.75V. A series of electrochemical tests of formation, rate, and cycling were conducted under each voltage window. During formation testing, a constant current (0.2C) was applied to the cell during the charge process, followed by a constant voltage charge until the current was equal to or less than 0.05C. Then, the cells were discharged at constant current (0.2C) until the end of discharge. Charging and discharging of the cells were repeated three times. During rate testing, the charging rate was fixed to 0.7C for all the rate tests, and then followed by constant voltage charge until the current was equal to or less than 0.05C. Five different discharge rates of 0.1C, 0.2C, 0.5C, 1C, and 2C were applied until the cells were completely discharged. Three cycles were conducted for each rate. Finally, 50 cycles were conducted to investigate cycle life. The same charging conditions as those of the rate test were applied. The discharge rate was fixed to 0.5C for all the cycles.

Figure 7:
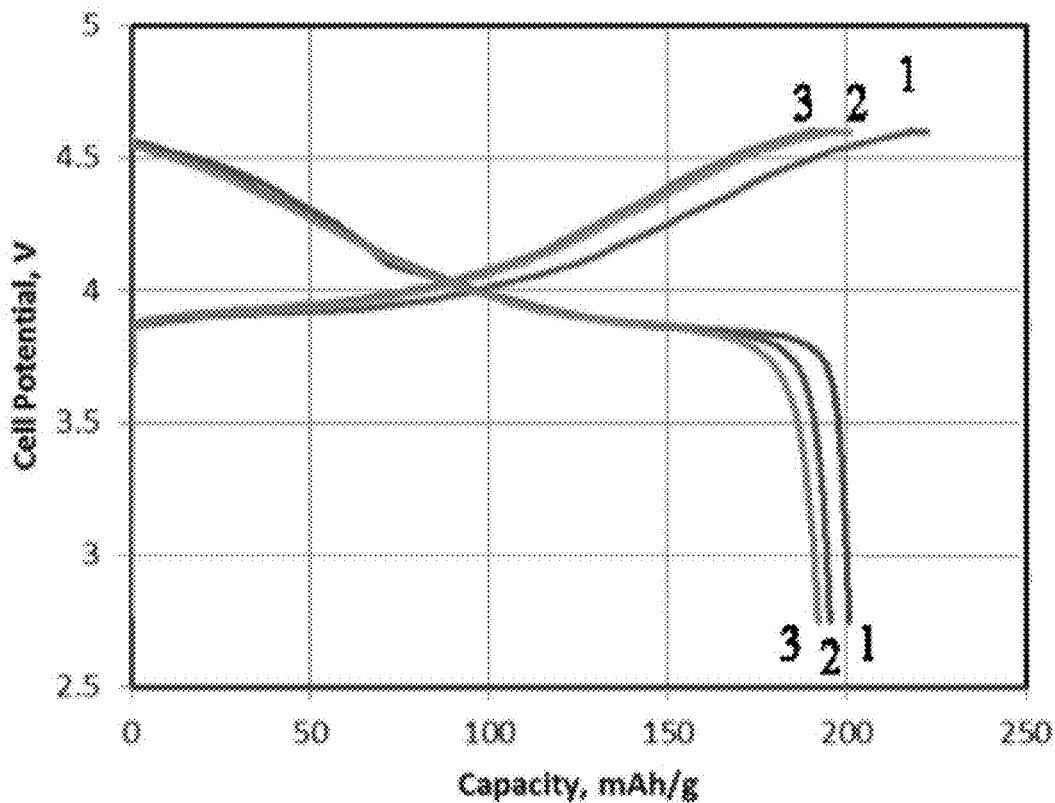
FIG. 7 shows a cell voltage profile for a battery cell in accordance with the disclosed embodiments.
Figure 8:
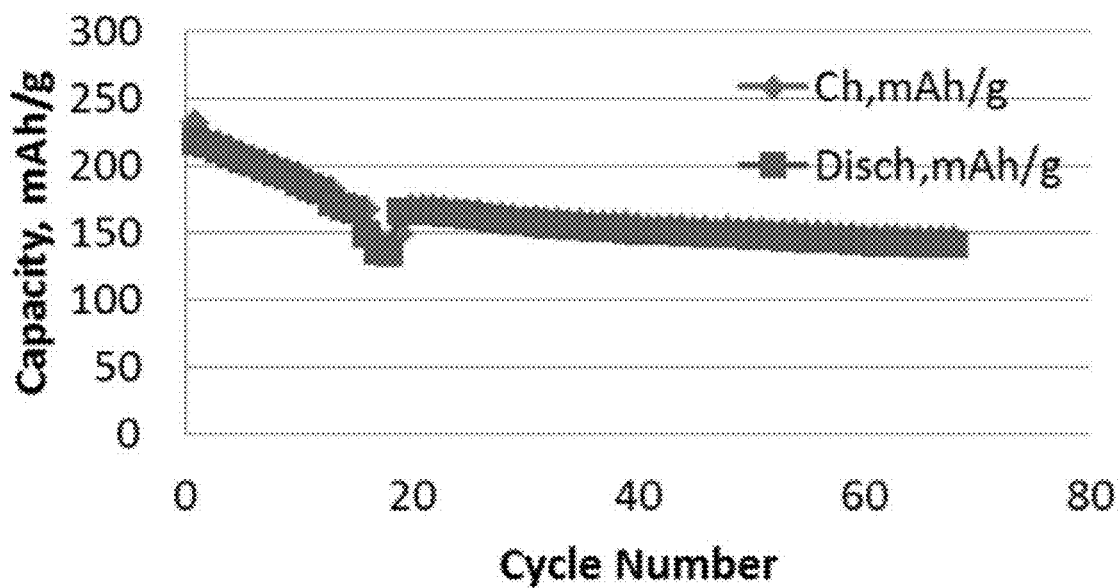
FIG. 8 shows a plot of capacity versus cycle number for a battery cell in accordance with the disclosed embodiments.
Figure 9:
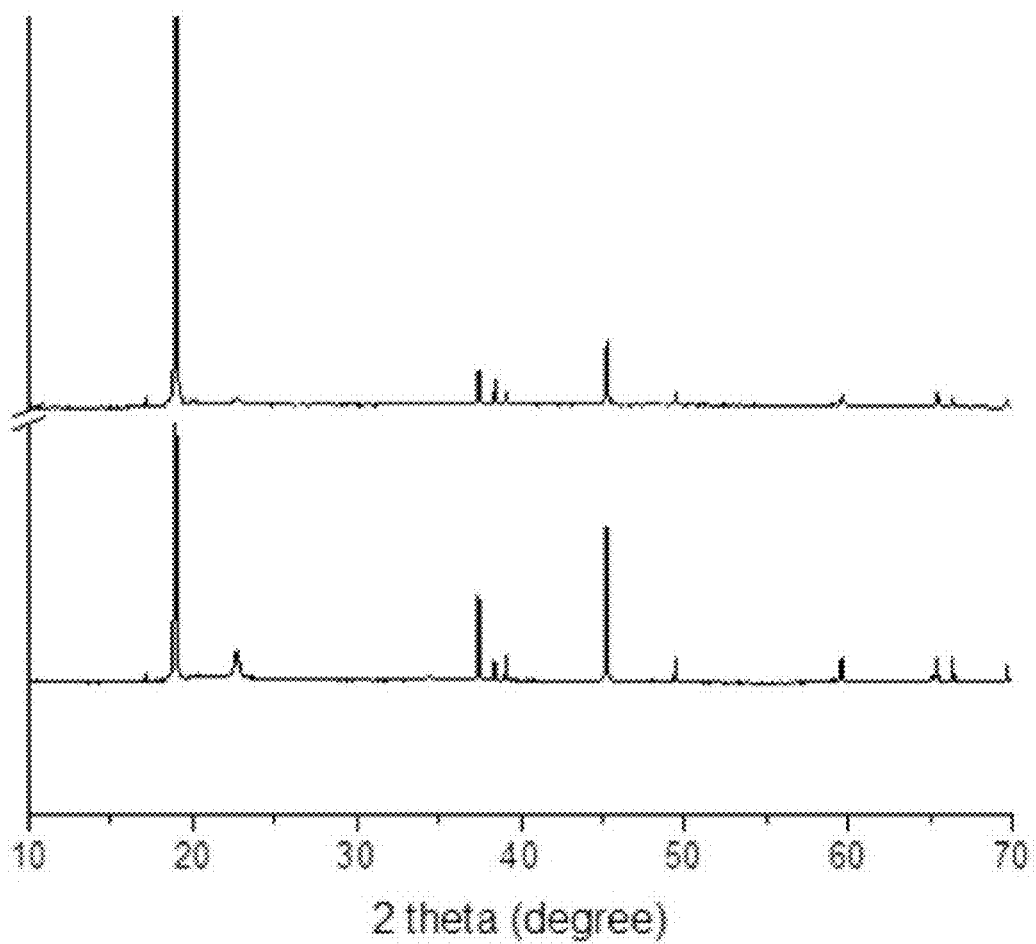
FIG. 9 shows XRD patterns of two cathodes in accordance with the disclosed embodiments.

The cell's voltage profile using the first charge-discharge curve between 2.75 and 4.6 V is shown in FIG. 7. The capacity versus cycle number for the cell is shown in FIG. 8, including the rate and cycle performance study. FIG. 9 shows XRD patterns of two electrodes containing the cathode active material: a first electrode after 50 cycles and a pristine second electrode. There remains a strong layered peak (003) that resides in the inventive material sample, and no impurity peaks are present. A summary of cycling data and performance metrics for the above-described battery cell is shown in Table 1 below.

TABLE 1

| | Rate | Charge Voltage (V) | | | |
| --- | --- | --- | --- | --- | --- |
| | | 4.4 | 4.5 | 4.6 | 4.7 |
| 1st Cycle Formation Charge Capacity, mAh/g | 0.2 C | 177.11 | 194.77 | 231.99 | 261.58 |
| 1st Cycle Formation Discharge Capacity, mAh/g | 0.2 C | 167.00 | 183.73 | 218.19 | 245.36 |
| 1st Cycle Formation Efficiency (%) | 0.2 C | 94.29% | 94.33% | 94.05% | 93.80% |
| 1st avg. discharge voltage | 0.2 C | 3.97 | 4.01 | 4.10 | 4.14 |

Example 4

The cathode active material synthesized in Example 2 was processed into electrode laminates to evaluate its electrochemical performance. Each electrode laminate was formed by making a slurry of 90 wt. % active material, 5 wt. % Super P carbon and 5 wt. % PVDF binder in an NMP solvent. The slurry was cast onto an aluminum current collector sheet using a doctor blade. The wet electrode laminate was dried first at 70-80° C. for ~4 hours in an air oven, and then followed by heated vacuum drying at 70-80° C. overnight (~16 hours). The electrode laminate was calendared. Electrodes of size 9/16" diameter were punched out from the aluminum sheet and built into size 2032 coin cells (Hohsen, Japan). The coin cells contained lithium as counter electrodes (e.g., anodes) and an electrolyte mixture of 3:7 (wt., EC: EMC) solvent and 1.2 M $LiPF_6$ salt. The separator was Celgard 2325 tri-layer polypropylene.

Figure 10A:
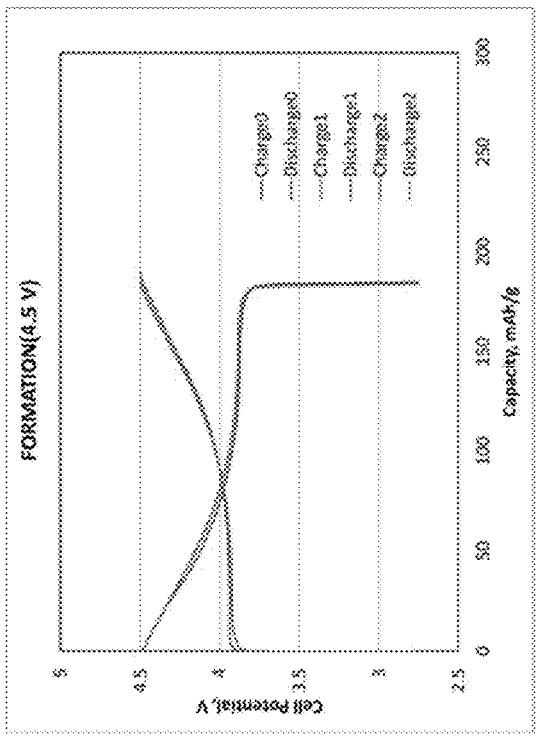
FIG. 10A shows a cell voltage profile for a battery cell in accordance with the disclosed embodiments.
Figure 10B:
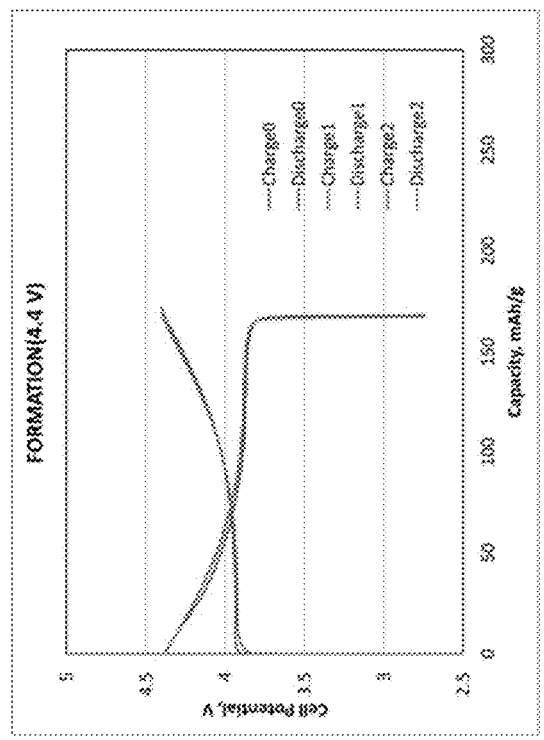
FIG. 10B shows a cell voltage profile for a battery cell in accordance with the disclosed embodiments.
Figure 10C:
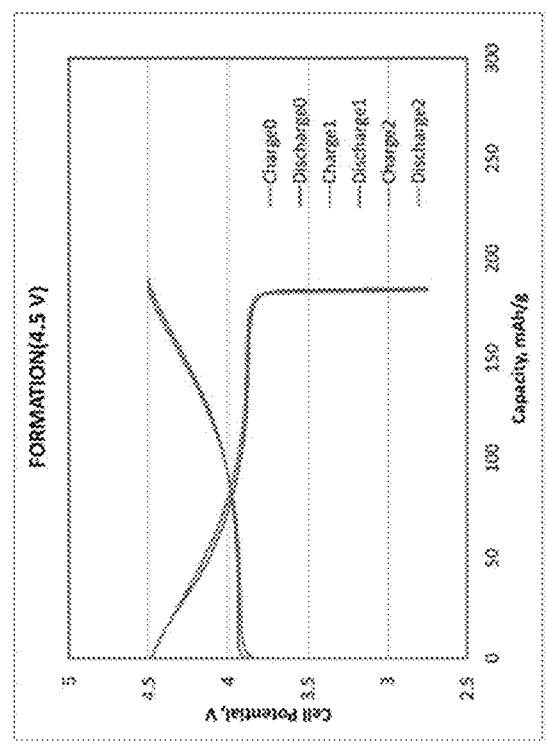
FIG. 10C shows a cell voltage profile for a battery cell in accordance with the disclosed embodiments.
Figure 10G:
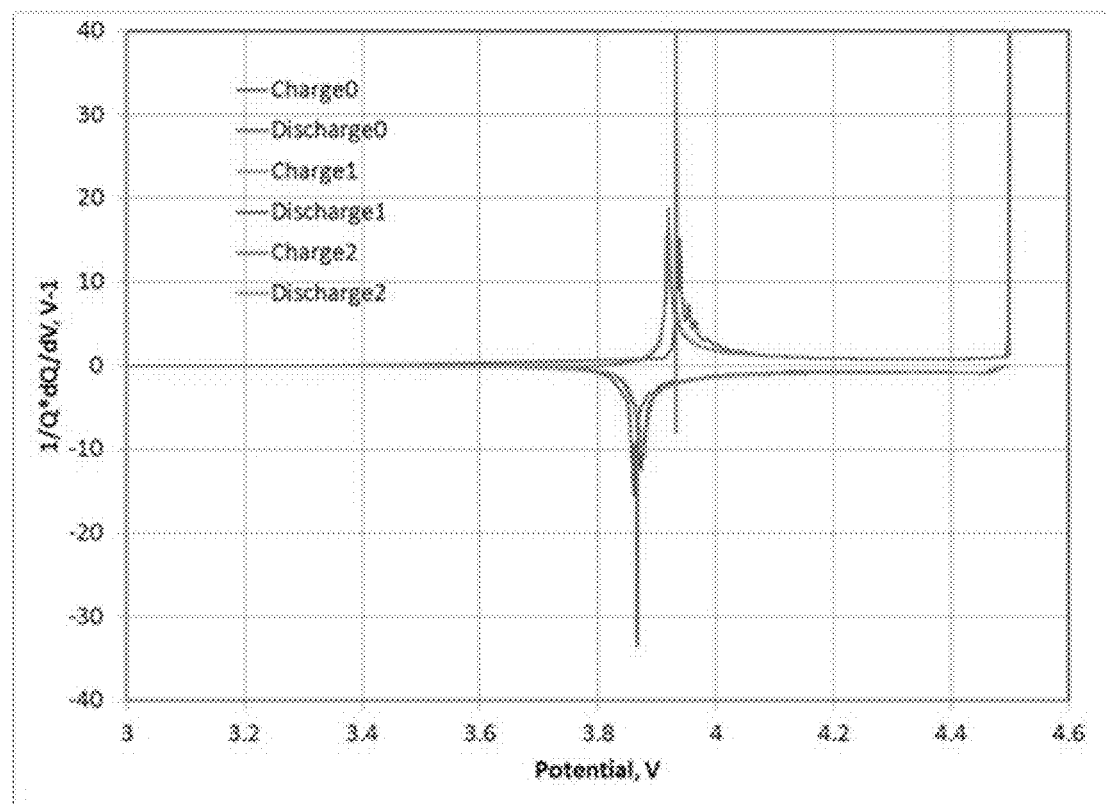
FIG. 10G shows a dQ/dV plot for a battery cell in accordance with the disclosed embodiments.

Cells were placed on a Maccor Series 2000 tester and cycled in galvanostatic mode at room temperature with various voltage windows: 4.4V to 2.75V, 4.5V to 2.75V and 4.6V to 2.75V. A series of electrochemical tests (e.g., formation with results shown in FIGS. 10A-C, rate with results shown in FIGS. 10D-F) were conducted under each voltage window. During formation testing, a constant current (0.2C) was applied to the cells during the charge process, followed by a constant voltage charge until the current was equal to or less than 0.05C. Then, the cells were discharged at constant current (0.2C) until the end of discharge. Charging and discharging of the cells were repeated three times. During rate testing, the charging rate was fixed to 0.7C for all the rate tests, and then followed by constant voltage charge till the current was equal to or less than 0.05C. Five different discharge rates of 0.1C, 0.2C, 0.5C, 1C, and 2C were applied until the cells were completely discharged. Three cycles were conducted for each rate. The dQ/dV derivative plot between 2.75V and 4.5V for the material prepared from Example 2 is shown in FIG. 10G. A lack of peaks at 4.1V to 4.3V indicates that there is no phase change for hexagonal to monoclinic in this inventive material.

Example 5

A material having the composition $0.01Li_2MnO_3 \cdot 0.99LiNi0.01Mn0.01Cu0.98O2$ is disclosed. In this example, the Ni and Mn content are not equal, and therefore, as written, the Ni oxidation state is nominally +2, and the Mn oxidation state is nominally +4.

Figure 11:
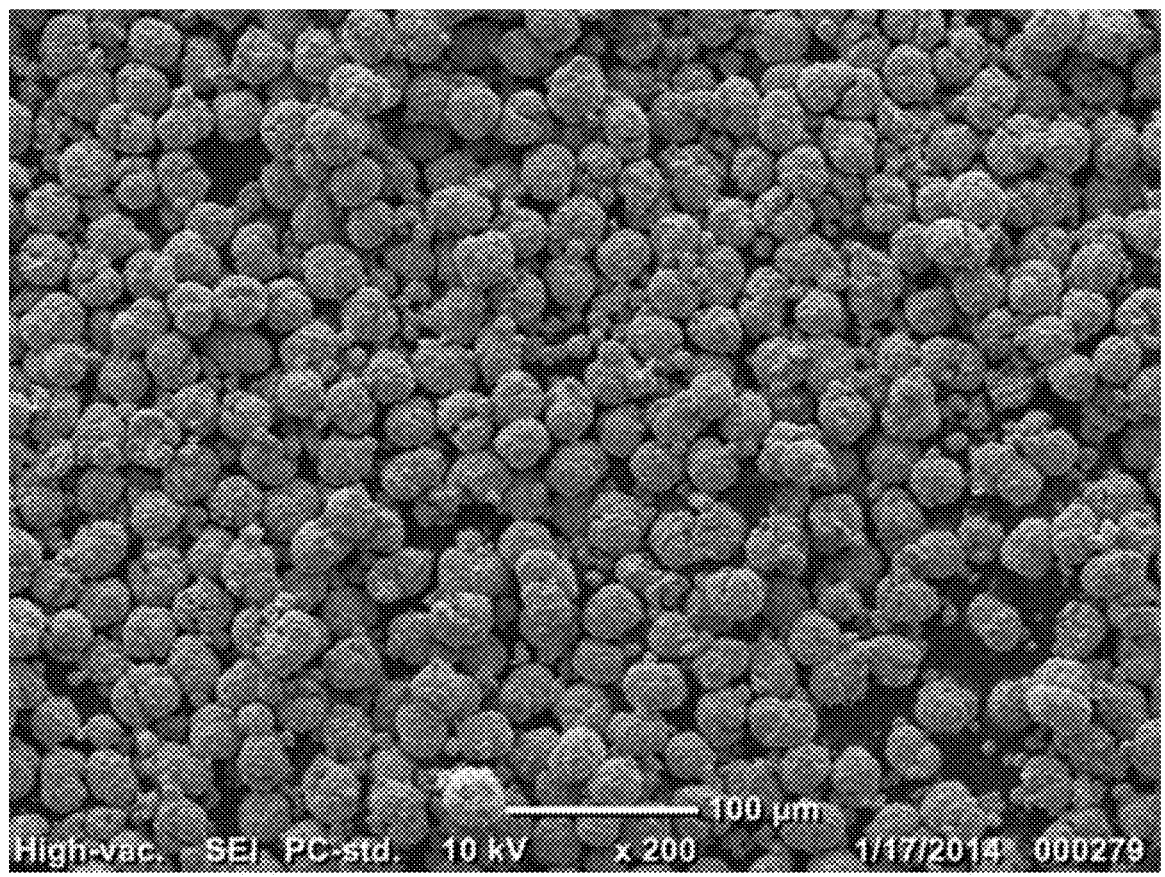
FIG. 11 shows an SEM of a cathode active material composition in accordance with the disclosed embodiments.

A layered material with composition represented by $0.01Li_2MnO_3 \cdot 0.99LiNi_{0.01}Mn_{0.01}Co_{0.98}O_2$ was made by the solid-state reaction of 23.0 g of $LiOH \cdot H_2O$ and 11.1 of hydrated $Ni_{0.01}Mn_{0.02}Co_{0.97}(OH)_2 \cdot nH_2O$ hydroxide pink powder made by a co-precipitation method. The powders were mixed in an orbital mixer. Following mixing, the mixed powder was transferred to an alumina high-temperature tray and heated first in air at 500° C. for 10 hours. The ramp rate of the furnace for this first step was 2° C. per minute. The sample was cooled in the furnace after it was turned off. The sample was subsequently ground by mortar and pestle, then sieved and re-fired at 1050° C. in air for 5 hours; the ramp rate was 2° C. per minute, and after firing was completed, a natural cool rate of the furnace turned off was used. The final sintered black powder was broken up and ground by mortar and pestle, then sieved for use in an electrochemical test as a cathode active material. Scanning electron micrographs (SEMs) of the final powder were taken using a JEOL Nikon Neoscope SEM instrument. An exemplary micrograph is shown in FIG. 11. Secondary particle sizes range from about 10 to about 30 microns in size.

Example 6

The cathode active material synthesized in Example 5 was processed into electrode laminates to evaluate its electrochemical performance. Each electrode laminate was formed by making a slurry of 90 wt. % active material, 5 wt. % Super P carbon and 5 wt. % PVDF binder in an NMP solvent. The slurry was cast onto an aluminum current collector sheet using a doctor blade. The wet electrode laminate was dried first at 70-80° C. for ~4 hours in an air oven, and then followed by heated vacuum drying at 70-80° C. overnight (~16 hours). The electrode laminate was calendared. Electrodes of size 9/16" diameter were punched out from the aluminum sheet and built into size 2032 coin cells (Hohsen, Japan). The coin cells contained lithium as counter electrodes (e.g., anodes) and an electrolyte mixture of 3:7 (wt., EC: EMC) solvent and 1.2 M $LiPF_6$ salt. The separator was Celgard 2325 tri-layer polypropylene.

Figure 12B:
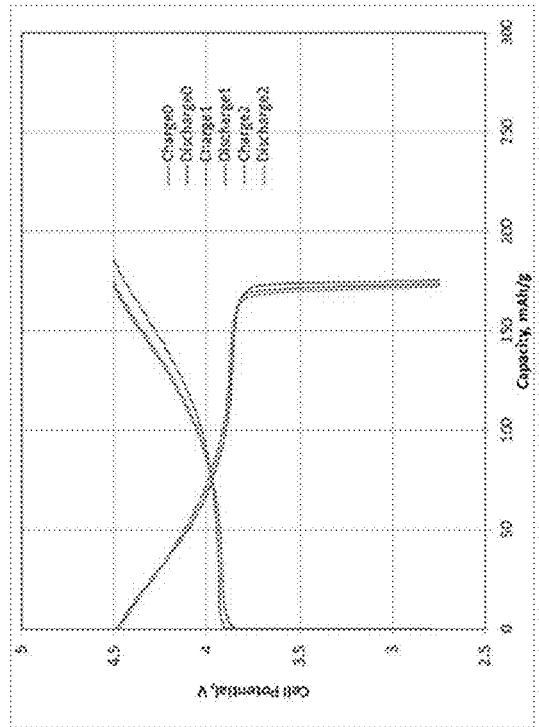
FIG. 12B shows a cell voltage profile between 2.75V and 4.5V for a battery cell in accordance with the disclosed embodiments.
Figure 12A:
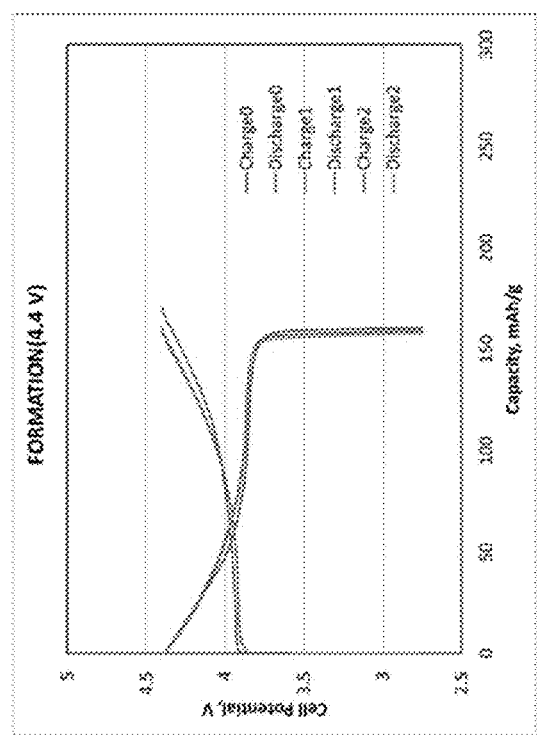
FIG. 12A shows a cell voltage profile between 2.75V and 4.4V for a battery cell in accordance with the disclosed embodiments.
Figure 12C:
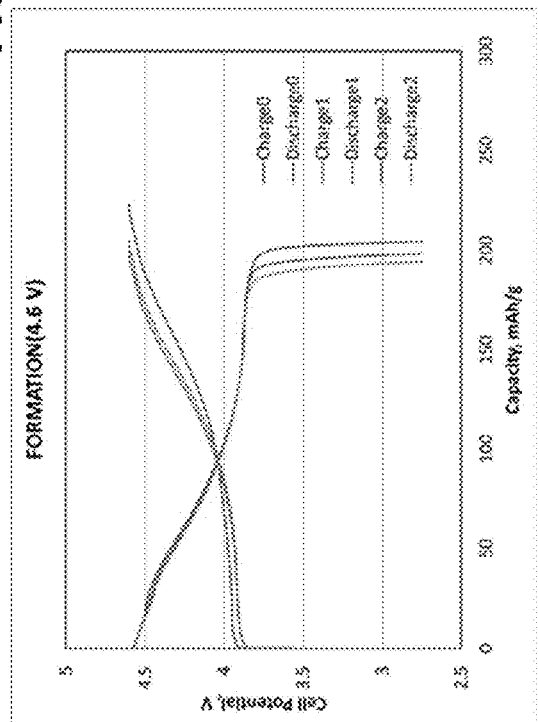
FIG. 12C shows a cell voltage profile between 2.75V and 4.6V for a battery cell in accordance with the disclosed embodiments.
Figure 12E:
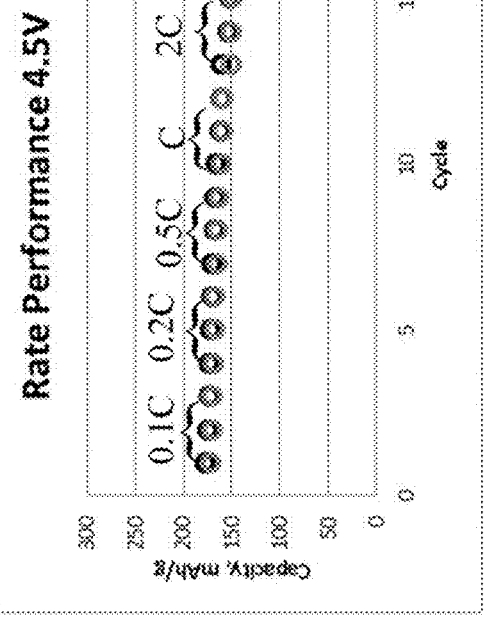
FIG. 12E shows a plot of capacity versus cycle number during rate study tests (C rates as marked) between 2.75V and 4.5V for a battery cell in accordance with the disclosed embodiments.
Figure 12D:
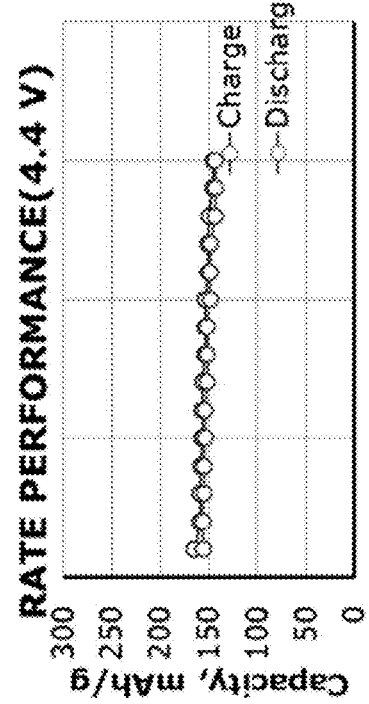
FIG. 12D shows a plot of capacity versus cycle number during rate study tests (C rates as marked) between 2.75 Vs and 4.4V for a battery cell in accordance with the disclosed embodiments.
Figure 12F:
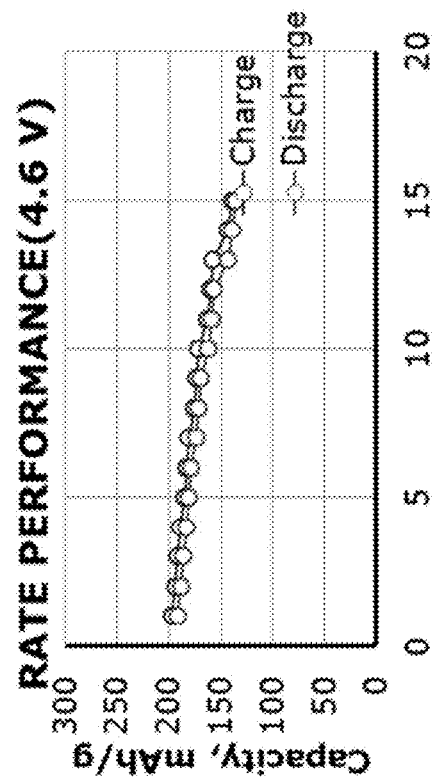
FIG. 12F shows a plot of capacity versus cycle number during rate study tests (C rates as marked) between 2.75V and 4.6V for a battery cell in accordance with the disclosed embodiments.

Cells were placed on a Maccor Series 2000 tester and cycled in galvanostatic mode at room temperature with various voltage windows: 4.4V to 2.75V, 4.5V to 2.75V, and 4.6V to 2.75V. A series of electrochemical tests (e.g., formation with results shown in FIGS. 12A-12C, rate with results shown in FIGS. 12D-12F) were conducted under each voltage window. During formation testing, a constant current (0.2C) was applied to the cells during the charge process, followed by a constant voltage charge until the current was equal to or less than 0.05C. Then, the cells were discharged at constant current (0.2C) until the end of discharge. Charging and discharging of the cells were repeated three times. During rate testing, the charging rate was fixed to 0.7C for all the rate tests, and then followed by constant voltage charge till the current was equal to or less than 0.05C. Five different discharge rates of 0.1C, 0.2C, 0.5C, 1C, and 2C were applied until the cells were completely discharged. Three cycles were conducted for each rate.

Figure 12G:
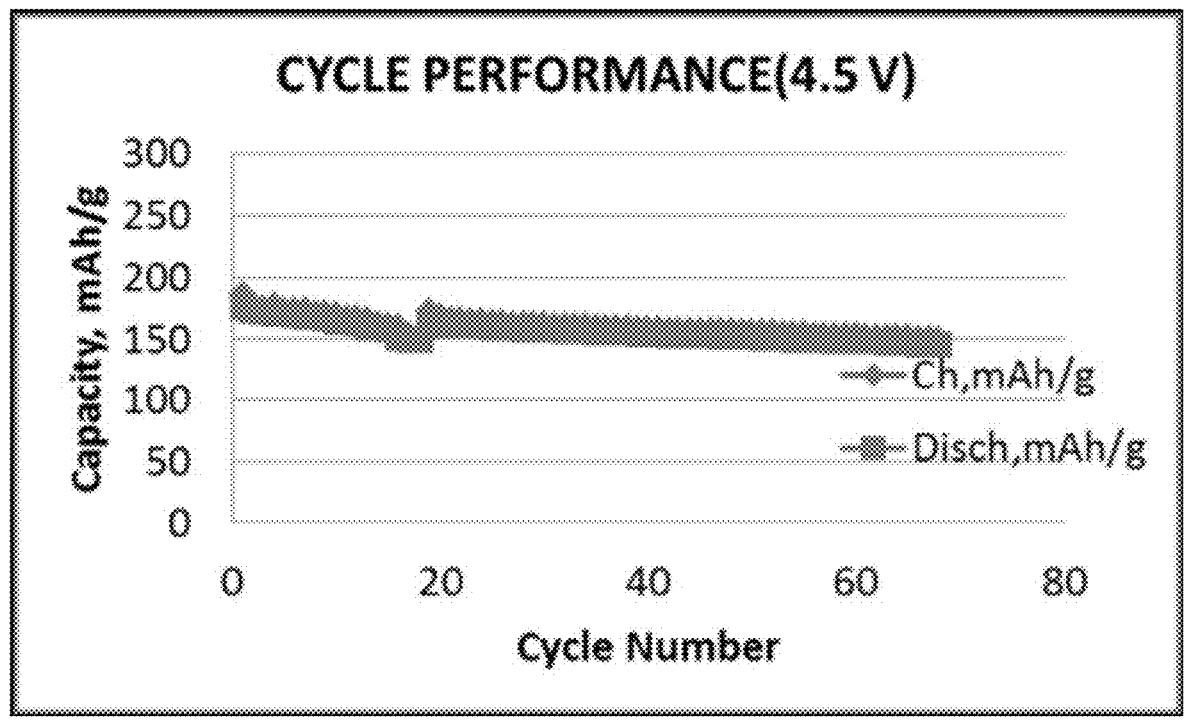
FIG. 12G shows a plot of capacity versus cycle number during a cycle performance study for a battery cell cycled between 2.75V and 4.5V in accordance with the disclosed embodiments.
Figure 12H:
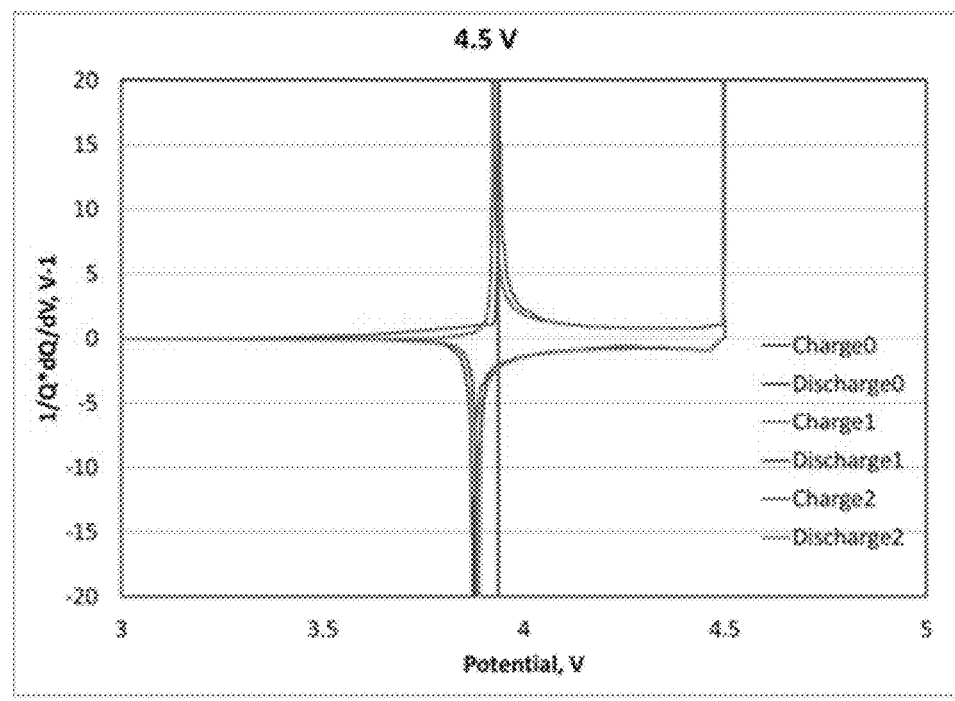
FIG. 12H shows a dO/dV plot for a battery cell in accordance with the disclosed embodiments.

To evaluate the cycle performance of the material, cells were placed on test and operated between 4.5V and 2.75V, as shown in FIG. 12G. After the rate study test was completed as indicated in FIG. 12G, then the next 50 cycles were discharged at 0.2C and charge at 0.2C. The galvanostatic charge was followed by constant voltage charge till the current was equal to or less than 0.05C. The dQ/dV derivative plot between 2.75V and 4.5V for the material prepared from Example 5 is shown in FIG. 12H. A lack of peaks at 4.1V to 4.3 V indicates that there is no phase change for hexagonal to monoclinic in this inventive material.

Figure 13:
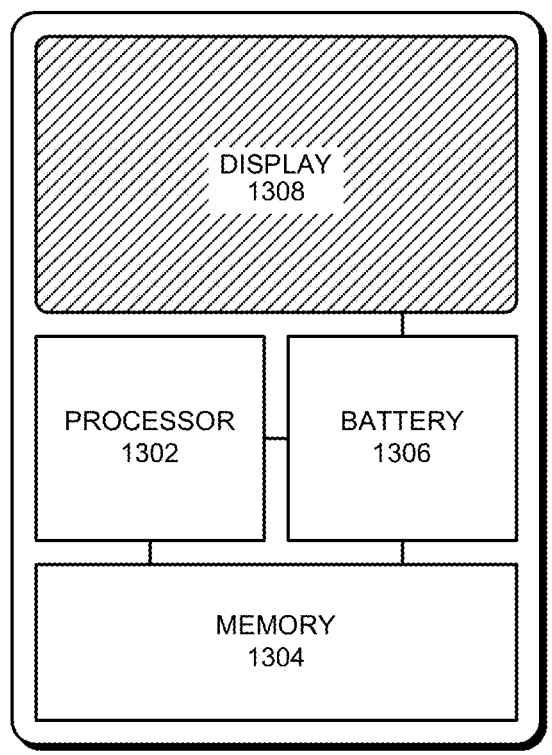
FIG. 13 shows a portable electronic device in accordance with the disclosed embodiments.

The above-described rechargeable battery cell can generally be used in any type of electronic device. For example, FIG. 13 illustrates a portable electronic device 1300 which includes a processor 1302, a memory 1304 and a display 1308, which are all powered by a battery 1306. Portable electronic device 1300 may correspond to a laptop computer, mobile phone, PDA, tablet computer, portable media player, digital camera, and/or other type of battery-powered electronic device. Battery 1306 may correspond to a battery pack that includes one or more battery cells. Each battery cell may include an anode containing an anode current collector and an anode active material disposed over the anode current collector. The battery cell may also include a cathode containing a cathode current collector and a cathode active material disposed over the cathode current collector. The cathode and anode may be sealed in a flexible pouch.

The cathode active material may have a composition represented by $xLi_2MO_3 \cdot (1-x)LiCo_yM'_{(1-y)}O_2$. M may be manganese, titanium, ruthenium, and/or zirconium. M' may be a monovalent cation, a divalent cation, a trivalent cation, a tetravalent cation, and/or a ruthenium cation. For example, M or M' may contain a mixture of metal cations with stoichiometric numbers that may or may not be equal. In addition, $0.01 \leq x \leq 0.50$ and $0.5 \leq y \leq 1.00$. Alternatively, $y=1.00$, M is Mn, and the composition is $xLi_2MnO_3 \cdot (1-x)LiCoO_2$.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:

1. A cathode active material composition having a composition represented by $xLi_2MO_3 \cdot (1-x)LiCo_yM'_{(1-y)}O_2$;
   wherein $0.01 \leq x < 0.30$;
   wherein M is manganese;
   wherein $0.8 \leq y < 1.00$;
   wherein M' is Al.

2. A cathode for a battery cell, comprising:
   a cathode current collector;
   a cathode active material disposed over the cathode current collector, having a composition represented by $xLi_2MO_3 \cdot (1-x)LiCo_yM'_{(1-y)}O_2$;
   wherein $0.01 \leq x < 0.30$;
   wherein M is manganese;
   wherein $0.8 \leq y < 1.00$;
   wherein M' is Al.

3. A battery cell, comprising:
   an anode, comprising:
      an anode current collector; and
      an anode active material disposed over the anode current collector; and
   a cathode, comprising:
      a cathode current collector;
      a cathode active material disposed over the cathode current collector, having a composition represented by $xLi_2MO_3 \cdot (1-x)LiCo_yM'_{(1-y)}O_2$;
      wherein $0.01 \leq x < 0.30$;
      wherein M is manganese;
      wherein $0.8 \leq y < 1.00$;
      wherein M' is Al.

4. The battery cell of claim 3, wherein the composition is formed using at least one of:
   a mixed-metal hydrated hydroxide precursor made using a solution co-precipitation method; and
   a lithium addition solid-state reaction.

5. The battery cell of claim 3, wherein the cathode has an amount of lithium that can be reversibly extracted from the cathode active material greater than 60%, and a reversible capacity greater than 165 mAh/g.

6. The battery cell of claim 3, wherein the cathode has an amount of lithium that can be reversibly extracted from the cathode active material greater than 75%, and a reversible capacity greater than 200 mAh/g.

7. A portable electronic device, comprising:
   a set of components powered by a battery pack; and
   the battery pack, comprising:
      a battery cell, comprising:
         an anode, comprising:
            an anode current collector; and
            an anode active material disposed over the anode current collector; and
         a cathode, comprising:
            cathode current collector;
            a cathode active material disposed over the cathode current collector, comprising a composition represented by $xLi_2MO_3 \cdot (1-x)LiCo_yM'_{(1-y)}O_2$;
         wherein $0.01 \leq x < 0.30$;
         wherein M is manganese;
         wherein $0.8 \leq y < 1.00$;
         wherein M' is Al.

* * * * *